United States Patent
Yi et al.

(10) Patent No.: US 10,694,470 B2
(45) Date of Patent: Jun. 23, 2020

(54) METHOD AND APPARATUS FOR CONTROLLING UPLINK POWER IN WIRELESS COMMUNICATION SYSTEM

(71) Applicant: LG ELECTRONICS INC., Seoul (KR)

(72) Inventors: Yunjung Yi, Seoul (KR); Joonkui Ahn, Seoul (KR); Kijun Kim, Seoul (KR); Dongyoun Seo, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/913,210

(22) PCT Filed: Sep. 4, 2014

(86) PCT No.: PCT/KR2014/008343
§ 371 (c)(1),
(2) Date: Feb. 19, 2016

(87) PCT Pub. No.: WO2015/034299
PCT Pub. Date: Mar. 12, 2015

(65) Prior Publication Data
US 2016/0205632 A1    Jul. 14, 2016

Related U.S. Application Data

(60) Provisional application No. 61/873,804, filed on Sep. 4, 2013, provisional application No. 61/927,503, filed
(Continued)

(51) Int. Cl.
*H04W 52/14*    (2009.01)
*H04W 72/04*    (2009.01)
(Continued)

(52) U.S. Cl.
CPC ....... *H04W 52/146* (2013.01); *H04W 52/281* (2013.01); *H04W 52/34* (2013.01);
(Continued)

(58) Field of Classification Search
CPC . H04W 52/40; H04W 52/146; H04W 52/346; H04W 72/0473; H04W 52/367; H04W 52/34
See application file for complete search history.

(56) References Cited

U.S. PATENT DOCUMENTS 9,509,483 B2    11/2016    Damnjanovic et al.
9,615,338 B2    4/2017    Kim et al.
(Continued)

FOREIGN PATENT DOCUMENTS

CN    101933377 A    12/2010
CN    102308544 A    1/2012
(Continued)

OTHER PUBLICATIONS

3GPP TS 36.101 V12.0.0, '3GPP; TSG RAN; E-UTRA; User Equipment (UE) radio transmission and reception (Release 12)' ,Jul. 7, 2013 (http://www.3gpp.org/dynareport/36101.htm), See pp. 59-69.
(Continued)

*Primary Examiner* — Yuwen Pan
*Assistant Examiner* — Fatuma G Sherif
(74) *Attorney, Agent, or Firm* — Dentons US LLP

(57) ABSTRACT

A method and apparatus for controlling an uplink power in a wireless communication system is provided. A user equipment (UE) allocates a first minimum reserved power for a first carrier group and a second minimum reserved power for a second carrier group, and after allocating the first minimum reserved power and the second minimum power, applies a power sharing rule for remaining power, except the first minimum reserved power and the second minimum
(Continued)

reserved power, between the first carrier group and the second carrier group.

15 Claims, 15 Drawing Sheets

Related U.S. Application Data on Jan. 15, 2014, provisional application No. 61/938,147, filed on Feb. 11, 2014, provisional application No. 61/940,379, filed on Feb. 15, 2014, provisional application No. 61/943,457, filed on Feb. 23, 2014, provisional application No. 61/976,486, filed on Apr. 7, 2014, provisional application No. 61/981,170, filed on Apr. 17, 2014, provisional application No. 61/984,030, filed on Apr. 24, 2014, provisional application No. 62/009,311, filed on Jun. 8, 2014, provisional application No. 62/014,120, filed on Jun. 19, 2014, provisional application No. 62/015,505, filed on Jun. 22, 2014, provisional application No. 62/033,630, filed on Aug. 5, 2014, provisional application No. 62/034,153, filed on Aug. 7, 2014.

(51) Int. Cl.
*H04W 72/10* (2009.01)
*H04W 52/34* (2009.01)
*H04W 52/36* (2009.01)
*H04W 52/28* (2009.01)
*H04L 5/00* (2006.01)
*H04W 52/40* (2009.01)
*H04W 88/06* (2009.01)

(52) U.S. Cl.
CPC ....... *H04W 52/346* (2013.01); *H04W 52/365* (2013.01); *H04W 52/367* (2013.01); *H04W 72/0473* (2013.01); *H04W 72/10* (2013.01); *H05K 999/99* (2013.01); *H04L 5/001* (2013.01); *H04W 52/40* (2013.01); *H04W 88/06* (2013.01)

(56) References Cited

U.S. PATENT DOCUMENTS

| | | | |
|---|---|---|---|
| 9,838,982 | B2 | 12/2017 | Yi et al. |
| 2009/0197632 | A1 | 8/2009 | Ghosh et al. |
| 2011/0243087 | A1 | 10/2011 | Ahn et al. |
| 2011/0275403 | A1 | 11/2011 | Chen et al. |
| 2011/0292874 | A1 | 12/2011 | Ho et al. |
| 2011/0310781 | A1 | 12/2011 | Kim et al. |
| 2012/0044882 | A1 | 2/2012 | Kim et al. |
| 2012/0113833 | A1 | 5/2012 | Jen |
| 2012/0163185 | A1* | 6/2012 | Zhang ............... H04W 72/085 370/241 |
| 2013/0176953 | A1* | 7/2013 | Stern-Berkowitz ........... H04W 52/146 370/329 |
| 2013/0195048 | A1 | 8/2013 | Ekpenyong et al. |
| 2013/0272231 | A1* | 10/2013 | Dinan ............... H04W 52/34 370/329 |
| 2014/0133415 | A1 | 5/2014 | Damnjanovic et al. |
| 2015/0029957 | A1 | 1/2015 | Han et al. |
| 2015/0036566 | A1* | 2/2015 | Blankenship ....... H04W 52/281 370/311 |
| 2015/0055454 | A1* | 2/2015 | Yang .................. H04W 36/22 370/230 |
| 2015/0117384 | A1 | 4/2015 | Papasakellariou et al. |
| 2015/0173016 | A1 | 6/2015 | Heo et al. |
| 2015/0358915 | A1 | 12/2015 | Semaan et al. |
| 2016/0135193 | A1 | 5/2016 | Zhang et al. |
| 2016/0174160 | A1* | 6/2016 | Shen ................. H04W 52/146 455/522 |
| 2016/0183290 | A1 | 6/2016 | Ko et al. |
| 2016/0255593 | A1 | 9/2016 | Blankenship et al. |

FOREIGN PATENT DOCUMENTS

| | | | |
|---|---|---|---|
| CN | 102428731 | A | 4/2012 |
| CN | 102469058 | A | 5/2012 |
| CN | 102573030 | A | 7/2012 |
| CN | 102934498 | A | 2/2013 |
| CN | 103069732 | A | 4/2013 |
| CN | 103069870 | A | 4/2013 |
| CN | 104349441 | * | 8/2013 |
| EP | 3011782 | A1 | 4/2016 |
| JP | 2012080540 | A | 4/2012 |
| JP | 2012-510785 | A | 5/2012 |
| JP | 2013-519325 | A | 5/2013 |
| JP | 2016531505 | A | 10/2016 |
| JP | 2017-513377 | A | 5/2017 |
| KR | 10-2011-0081896 | A | 7/2011 |
| KR | 1020120103747 | A | 9/2012 |
| KR | 10-2013-0024895 | A | 3/2013 |
| KR | 1020130053635 | A | 5/2013 |
| RU | 2360377 | C2 | 6/2009 |
| WO | 2007120085 | A1 | 10/2007 |
| WO | 2010/065759 | A2 | 6/2010 |
| WO | 2010129146 | A2 | 11/2010 |
| WO | 2012/062155 | A1 | 5/2012 |
| WO | 12173570 | A1 | 12/2012 |
| WO | 2013/025562 | A2 | 2/2013 |
| WO | 2013/069746 | A1 | 5/2013 |
| WO | 15-018348 | A1 | 2/2015 |
| WO | 2015017205 | A1 | 2/2015 |
| WO | 2015/153382 | A1 | 10/2015 |

OTHER PUBLICATIONS

CATR, 'Power scaling method for UL PC with Carrier aggregation', R1-102011, 3GPP TSG RAN WG1 meeting #60bis, Beijing, China, Apr. 12-16, 2010 (http://www.3gpp.org/ftp/tsg_ran/wg1_rl1/TSGR1_60b/Docs/R1-102011.zip), See pp. 1-6.
R4-132247:TSG RAN Working Group 4 (Radio) meeting #67, Fukuoka, Japan, May 20-24, 2013, Ericsson, ST-Ericsson, "PCmax with piggy-backed SRS and MTA," pp. 1-5.
R1-133565: 3GPP TSG RAN WG1 Meeting #74, Barcelona, Spain, Aug. 19-23, 2013, ASUSTek, "Physical Layer Impacts of Dual Connectivity for Small Cell Enhancement," pp. 1-3.
R1-133533: 3GPP TSG RAN WG1 Meeting #74: Barcelona, Spain, Aug. 19-23, 2013, "PHY aspect of small cell dual connectivity," Blackberry UK Limited; pp. 1-5.
R2-106387: 3GPP TSG RAN WG2 Meeting #72, Jacksonville, USA, Nov. 15-19, 2010, CATT, "Additional Information Report for PHR," pp. 1-3.
R2-131095: 3GPP TSG RAN WG2 Meeting #81bis, Chicago, USA, Apr. 15-19, 2013, Pantech, "Consideration on Scheduler Architecture for dual connectivity," pp. 1-5.
Ericsson, et al.: "Physical layer aspects of dual connectivity", R1-133436, 3GPP TSG RAN WG1 Meeting #74, Barcelona, Spain, Aug. 19-23, 2013.
ETRI: "Physical layers aspects of dual connectivity", R1-133182, 3GPP TSG RAN WG1 Meeting #74, Barcelona, Spain, Aug. 19-23, 2013.
NSN, et al.: "PHR for dual connectivity", R2-140139, 3GPP TSG RAN WG2 Meeting #84, Prague, Czech Republic, Feb. 10-14, 2014.
NTT DOCOMO: "Outcome of offline discussion on TPC aspects of dual connectivity", R1-141863, 3GPP TSG RAN WG1 Meeting #76bis, Shenzhen, China, Mar. 31-Apr. 4, 2014.
NTT DOCOMO: "Summary of email discussion [76b-08]", R1-142263, 3GPP TSG RAN WG1 Meeting #77, Seoul, Korea, May 19-23, 2014.

* cited by examiner

METHOD AND APPARATUS FOR CONTROLLING UPLINK POWER IN WIRELESS COMMUNICATION SYSTEM

This application is a 35 USC § 371 National Stage entry of International Application No. PCT/KR2014/008343 filed on Sep. 4, 2014, which claims priority to U.S. Provisional Application No. 61/873,804, filed on Sep. 4, 2013, U.S. Provisional Application No. 61/927,503, filed on Jan. 15, 2014, U.S. Provisional Application No. 61/938,147 filed on Feb. 11, 2014, U.S. Provisional Application No. 61/940,379, filed on Feb. 15, 2014, U.S. Provisional Application No. 61/943,457, filed on Feb. 23, 2014, U.S. Provisional Application No. 61/976,486, filed on Apr. 7, 2014, U.S. Provisional Application No. 61/981,170, filed on Apr. 17, 2014, U.S. Provisional Application No. 61/984,030, filed on Apr. 24, 2014, U.S. Provisional Application No. 62/009,311 filed on Jun. 8, 2014, U.S. Provisional Application No. 62/014,120, filed on Jun. 19, 2014, U.S. Provisional Application No. 62/015,505, filed on Jun. 22, 2014, U.S. Provisional Application No. 62/033,630, filed on Aug. 5, 2014, and U.S. Provisional Application No. 62/034,153, filed on Aug. 7, 2014, all of which are incorporated by reference in their entirety herein.

BACKGROUND OF THE INVENTION

Field of the Invention

The present invention relates to wireless communications, and more particularly, to a method and apparatus for controlling an uplink power in a wireless communication system.

Related Art

Universal mobile telecommunications system (UMTS) is a $3^{rd}$ generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the $3^{rd}$ generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

To increase the capacity for the users' demand of services, increasing the bandwidth may be essential, a carrier aggregation (CA) technology or resource aggregation over intra-node carriers or inter-node carriers aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). For inter-node resource aggregation, for each node, carrier group (CG) can be established here one CG can have multiple CCs. Each CC is defined by a single bandwidth and a center frequency.

In LTE Rel-12, a new study on small cell enhancement has started, where dual connectivity is supported. Dual connectivity is an operation where a given UE consumes radio resources provided by at least two different network points (master eNB (MeNB) and secondary eNB (SeNB)) connected with non-ideal backhaul while in RRC_CONNECTED. Furthermore, each eNB involved in dual connectivity for a UE may assume different roles. Those roles do not necessarily depend on the eNB's power class and can vary among UEs.

Uplink power control determines the average power over a single carrier frequency division multiple access (SC-FDMA) symbol in which the physical channel is transmitted. Uplink power control controls the transmit power of the different uplink physical channels. Efficient uplink power control method for CA or dual connectivity may be required.

SUMMARY OF THE INVENTION

The present invention provides a method and apparatus for controlling an uplink power in a wireless communication system. The present invention provides a method for controlling an uplink power when a user equipment (UE) is configured with inter-site carriers over ideal or non-ideal backhaul where independent scheduling and power control is performed at each site. The present invention provides a method for configuring minimum reserved transmission power for each carrier group, and applying power sharing rule for unused transmission power in case that the UE experiences the limited power due to its maximum allowed power.

In an aspect, a method for controlling, by a user equipment (UE), uplink power in a wireless communication system is provide. The method includes allocating a first minimum reserved power for a first carrier group and a second minimum reserved power for a second carrier group, and after allocating the first minimum reserved power and the second minimum power, applying a power sharing rule for remaining power, except the first minimum reserved power and the second minimum reserved power, between the first carrier group and the second carrier group.

In another aspect, a user equipment (UE) in a wireless communication system is provided. The UE includes a radio frequency (RF) unit for transmitting or receiving a radio signal, and a processor coupled to the RF unit, and configured to allocate a first minimum reserved power for a first carrier group and a second minimum reserved power for a second carrier group, and after allocating the first minimum reserved power and the second minimum power, apply a power sharing rule for remaining power, except the first minimum reserved power and the second minimum reserved power, between the first carrier group and the second carrier group.

Separate minimum reserved power can be guaranteed for each eNodeB (eNB) or each carrier group.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink and employs the SC-FDMA in uplink. LTE-advance (LTE-A) is an evolution of the 3GPP LTE. For clarity, this application focuses on the 3GPP LTE/LTE-A. However, technical features of the present invention are not limited thereto.

Figure 1:
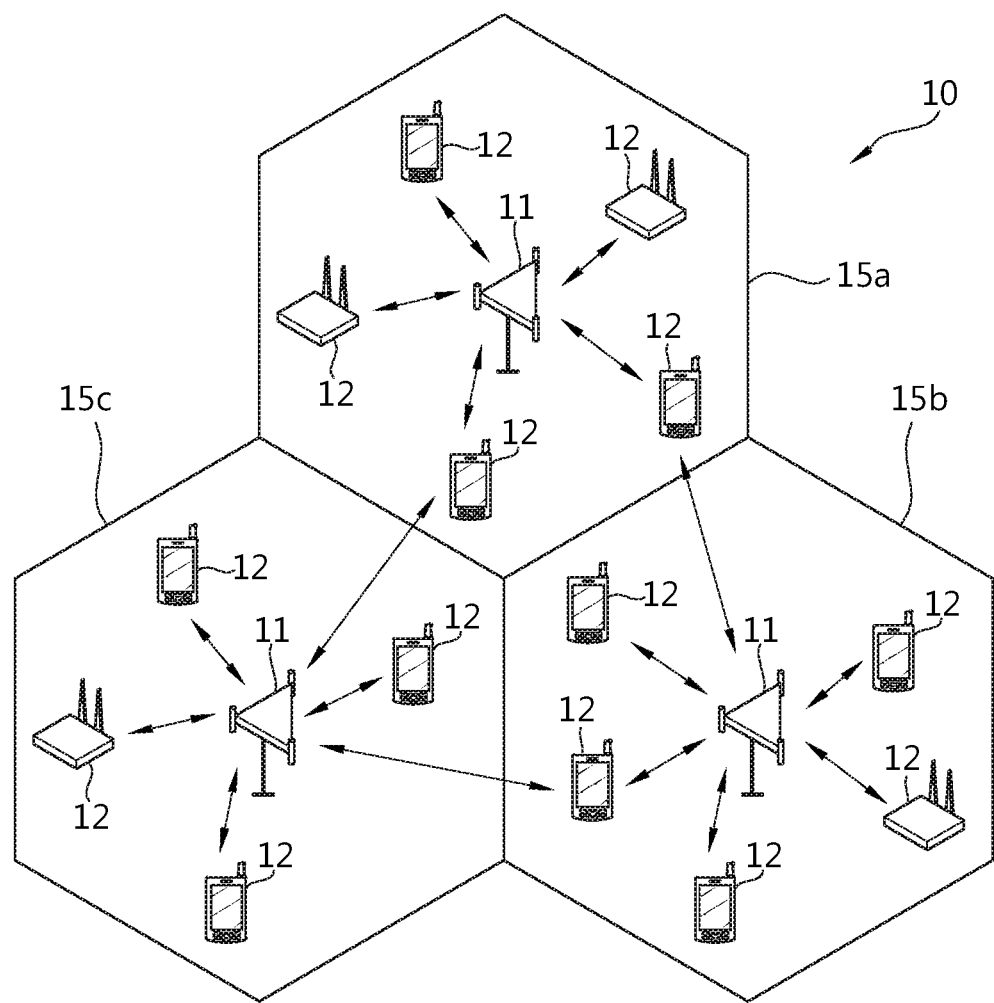
FIG. 1 shows a wireless communication system.

FIG. 1 shows a wireless communication system. The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The BS 11 generally refers to a fixed station that communicates with the UE 12 and may be called by other names such as evolved-NodeB (eNB), base transceiver system (BTS), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
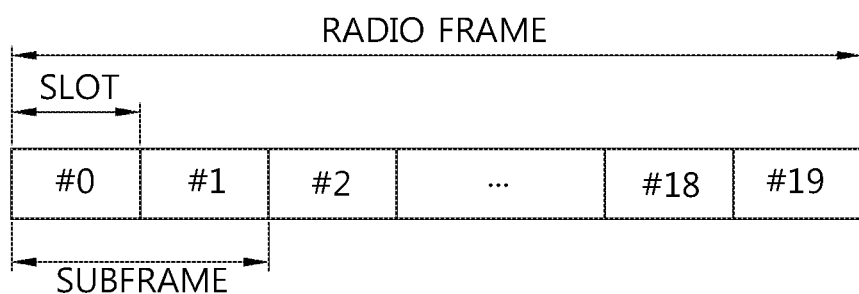
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbols may be called by other names depending on a multiple-access scheme. For example, when SC-FDMA is in use as an uplink multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

3GPP LTE defines that one slot includes seven OFDM symbols in a normal cyclic prefix (CP) and one slot includes six OFDM symbols in an extended CP.

The wireless communication system may be divided into a frequency division duplex (FDD) scheme and a time division duplex (TDD) scheme. According to the FDD scheme, an uplink transmission and a downlink transmission are made at different frequency bands. According to the TDD scheme, an uplink transmission and a downlink transmission are made during different periods of time at the same frequency band. A channel response of the TDD scheme is substantially reciprocal. This means that a downlink channel response and an uplink channel response are almost the same in a given frequency band. Thus, the TDD-based wireless communication system is advantageous in that the downlink channel response can be obtained from the uplink channel response. In the TDD scheme, the entire frequency band is time-divided for uplink and downlink transmissions, so a downlink transmission by the BS and an uplink transmission by the UE cannot be simultaneously performed. In a TDD system in which an uplink transmission and a downlink transmission are discriminated in units of subframes, the uplink transmission and the downlink transmission are performed in different subframes.

Figure 3:
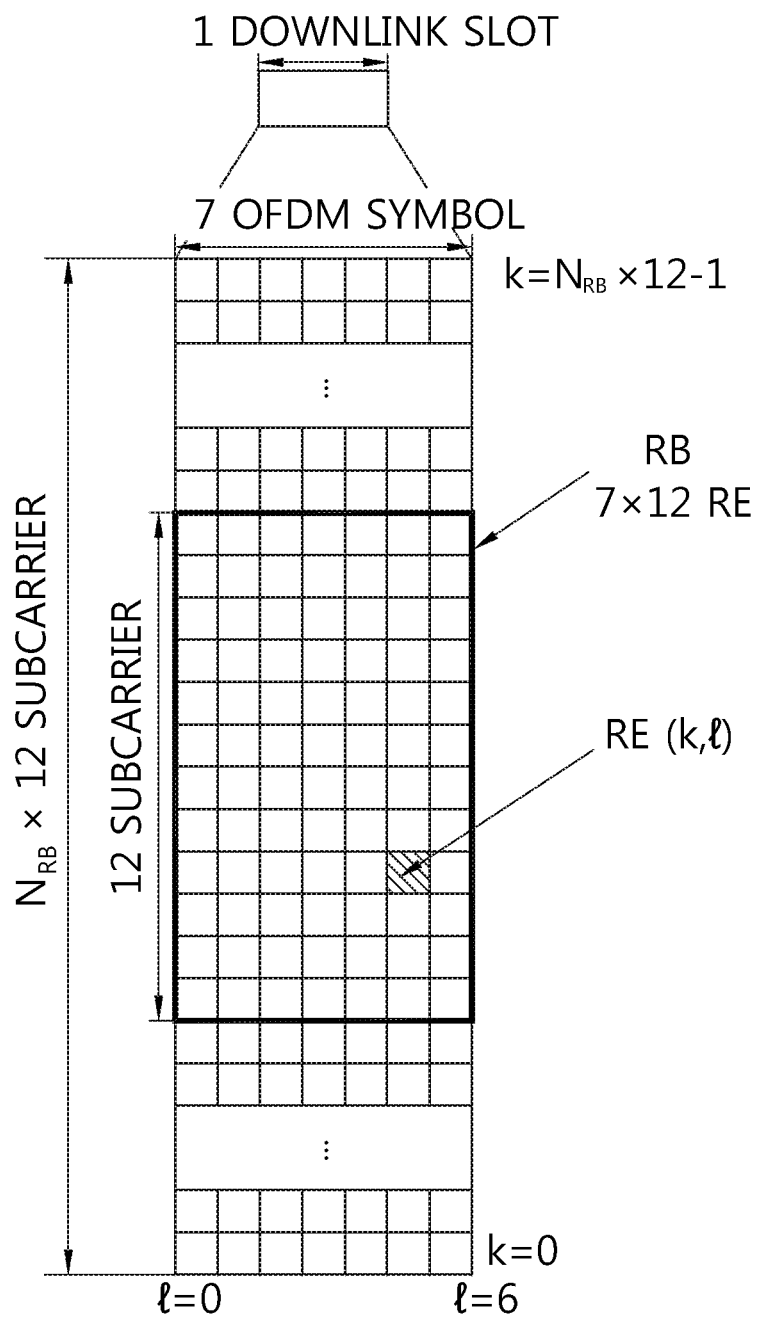
FIG. 3 shows a resource grid for one downlink slot.

FIG. 3 shows a resource grid for one downlink slot. Referring to FIG. 3, a downlink slot includes a plurality of OFDM symbols in time domain. It is described herein that one downlink slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the downlink slot depends on a downlink transmit bandwidth. The structure of an uplink slot may be same as that of the downlink slot.

The number of OFDM symbols and the number of subcarriers may vary depending on the length of a CP, frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
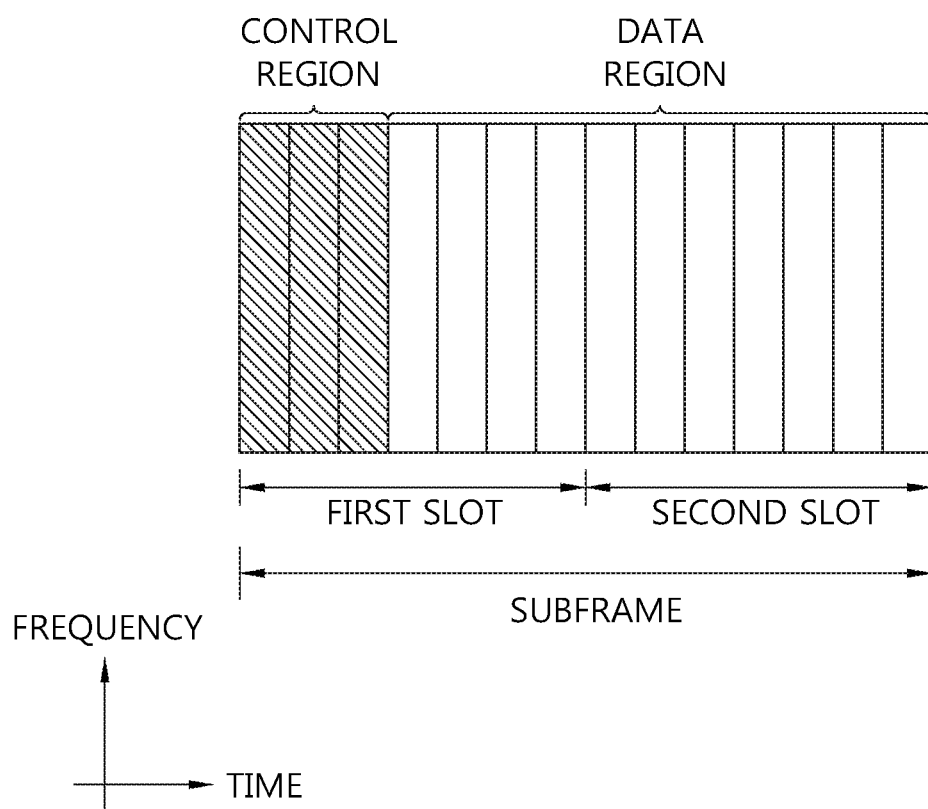
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/non-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 5:
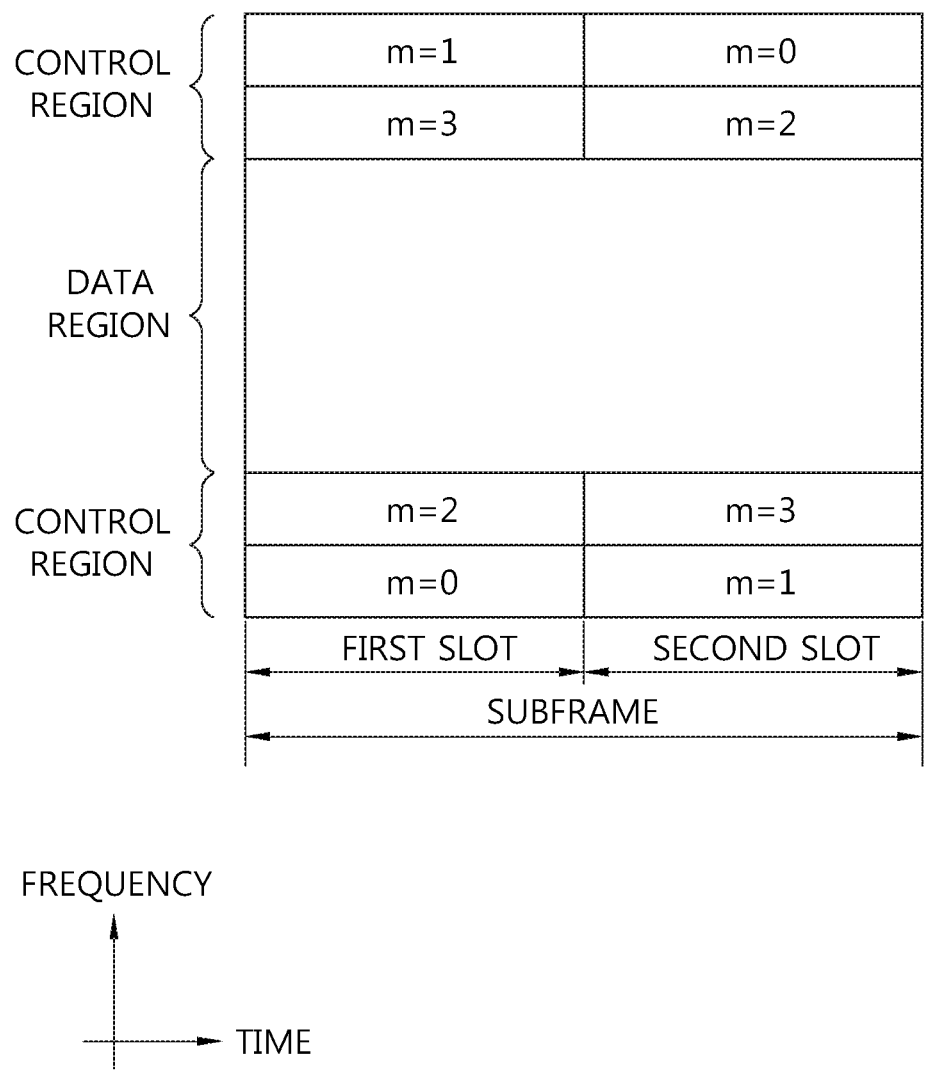
FIG. 5 shows structure of an uplink subframe.

FIG. 5 shows structure of an uplink subframe. Referring to FIG. 5, an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting uplink control information through different subcarriers according to time.

Uplink control information transmitted on the PUCCH may include a hybrid automatic repeat request (HARQ) acknowledgement/non-acknowledgement (ACK/NACK), a channel quality indicator (CQI) indicating the state of a downlink channel, a scheduling request (SR), and the like.

The PUSCH is mapped to an uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

Carrier aggregation (CA) is described. It may be referred to Section 5.5 of 3GPP TS 36.300 V11.6.0 (2013-06).

In CA, two or more component carriers (CCs) are aggregated in order to support wider transmission bandwidths up to 100 MHz or more. A UE may simultaneously receive or transmit on one or multiple CCs depending on its capabilities. A UE with single timing advance capability for CA can simultaneously receive and/or transmit on multiple CCs corresponding to multiple serving cells sharing the same timing advance (multiple serving cells grouped in one timing advance group (TAG)). A UE with multiple timing advance capability for CA can simultaneously receive and/or transmit on multiple CCs corresponding to multiple serving cells with different timing advances (multiple serving cells grouped in multiple TAGs). E-UTRAN ensures that each TAG contains at least one serving cell. A non-CA capable UE can receive on a single CC and transmit on a single CC corresponding to one serving cell only (one serving cell in one TAG).

A serving cell is combination of downlink and optionally uplink resources. That is, a serving cell may consist of one DL CC and one UL CC. Alternatively, a serving cell may consist of one DL CC. CA may have a plurality of serving cells. The plurality of serving cells may consist of one primary serving cell (PCell) and at least one secondary serving cell (SCell). PUCCH transmission, random access procedure, etc., may be performed only in the PCell.

Figure 6:
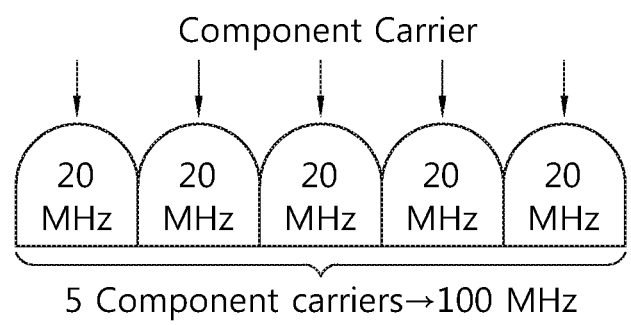
FIG. 6 shows an example of a carrier aggregation of 3GPP LTE-A.

FIG. 6 shows an example of a carrier aggregation of 3GPP LTE-A. Referring to FIG. 6, each CC has a bandwidth of 20 MHz, which is a bandwidth of 3GPP LTE. Up to 5 CCs or more may be aggregated, so maximum bandwidth of 100 MHz or more may be configured.

CA is supported for both contiguous and non-contiguous CCs with each CC limited to a maximum of 110 RBs in the frequency domain using the Rel-8/9 numerology.

It is possible to configure a UE to aggregate a different number of CCs originating from the same eNB and of possibly different bandwidths in the UL and the DL. The number of DL CCs that can be configured depends on the DL aggregation capability of the UE. The number of UL CCs that can be configured depends on the UL aggregation capability of the UE. In typical TDD deployments, the number of CCs and the bandwidth of each CC in UL and DL is the same. A number of TAGs that can be configured depends on the TAG capability of the UE.

CCs originating from the same eNB need not to provide the same coverage.

CCs shall be LTE Rel-8/9 compatible. Nevertheless, existing mechanisms (e.g., barring) may be used to avoid Rel-8/9 UEs to camp on a CC.

The spacing between center frequencies of contiguously aggregated CCs shall be a multiple of 300 kHz. This is in order to be compatible with the 100 kHz frequency raster of Rel-8/9 and at the same time preserve orthogonality of the subcarriers with 15 kHz spacing. Depending on the aggregation scenario, the n×300 kHz spacing can be facilitated by insertion of a low number of unused subcarriers between contiguous CCs.

For TDD CA, the downlink/uplink configuration is identical across component carriers in the same band and may be the same or different across component carriers in different bands.

Dual connectivity is described.

Figure 7:
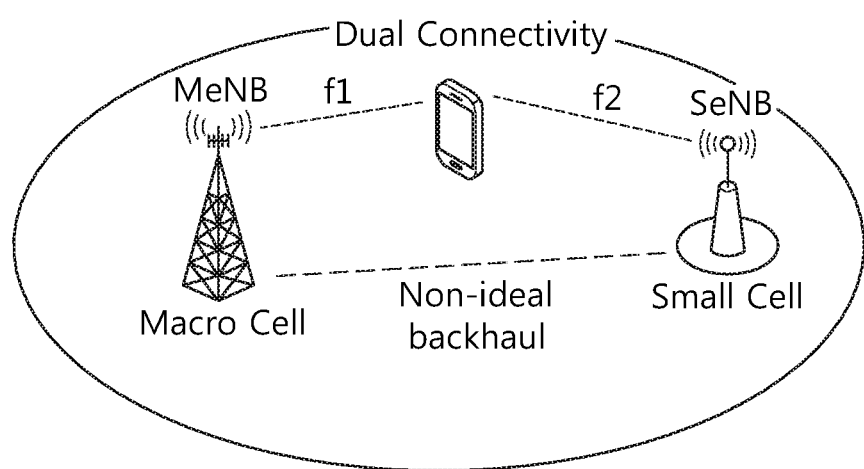
FIG. 7 shows an example of dual connectivity to a macro cell and a small cell.

FIG. 7 shows an example of dual connectivity to a macro cell and a small cell. Referring to FIG. 7, the UE is connected to both the macro cell and the small cell. A macro cell eNB serving the macro cell is the MeNB in dual connectivity, and a small cell eNB serving the small cell is the SeNB in dual connectivity. The MeNB is an eNB which terminates at least S1-MME and therefore act as mobility anchor towards the CN in dual connectivity. If a macro eNB exists, the macro eNB may function as the MeNB, generally. The SeNB is an eNB providing additional radio resources for the UE, which is not the MeNB, in dual connectivity. The SeNB may be generally configured for transmitting best effort (BE) type traffic, while the MeNB may be generally configured for transmitting other types of traffic such as VoIP, streaming data, or signaling data. The interface between the MeNB and SeNB is called Xn interface. The Xn interface is assumed to be non-ideal, i.e., the delay in Xn interface could be up to 60 ms.

Uplink power control according to the current specification of 3GPP LTE is described. It may be referred to Section of 5.1 of 3GPP TS 36.213 V11.3.0 (2013-06). For PUSCH, the transmit power $\hat{P}_{PUSCH,c}(i)$ is first scaled by the ratio of the number of antennas ports with a non-zero PUSCH transmission to the number of configured antenna ports for the transmission scheme. The resulting scaled power is then split equally across the antenna ports on which the non-zero PUSCH is transmitted. For PUCCH or sounding reference signal (SRS), the transmit power $\hat{P}_{PUCCH}(i)$ or $\hat{P}_{SRS,c}(i)$ is split equally across the configured antenna ports for PUCCH or SRS. $\hat{P}_{SRS,c}(i)$ is the linear value of $P_{SRS,c}(i)$.

Uplink power control for the PUSCH is described. The setting of the UE transmit power for a PUSCH transmission is defined as follows. If the UE transmits PUSCH without a simultaneous PUCCH for the serving cell c, then the UE transmit power $P_{PUSCH,c}(i)$ for PUSCH transmission in subframe i for the serving cell c is given by Equation 1.

$$P_{PUSCH,c}(i) = \min \begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$
[dBm]
⟨Equation 1⟩

If the UE transmits PUSCH simultaneous with PUCCH for the serving cell c, then the UE transmit power $P_{PUSCH,c}(i)$ for the PUSCH transmission in subframe i for the serving cell c is given by Equation 2.

$$P_{PUSCH,c}(i) = \min \begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$
[dBm]
⟨Equation 2⟩

If the UE is not transmitting PUSCH for the serving cell c, for the accumulation of transmit power control (TPC) command received with DCI format 3/3A for PUSCH, the UE shall assume that the UE transmit power $P_{PUSCH,c}(i)$ for the PUSCH transmission in subframe i for the serving cell c is computed by Equation 3.

$$P_{PUSCH,c}(i) = \min\{P_{CMAX,c}(i), P_{O\_PUSCH,c}(1) + \alpha_c(1) \cdot PL_c + f_c(i)\} \text{ [dBm]}$$
⟨Equation 3⟩

In equations described above, $P_{CMAX,c}(i)$ is the configured UE transmit power in subframe i for serving cell c and $\hat{P}_{CMAX,c}(i)$ is the linear value of $P_{CMAX,c}(i)$. $\hat{P}_{PUCCH}(i)$ is the linear value of $P_{PUCCH}(i)$ described below. $M_{PUSCH,c}(i)$ is the bandwidth of the PUSCH resource assignment expressed in number of resource blocks valid for subframe i and serving cell c. $P_{O\_PUSCH,c}(j)$ is a parameter composed of the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for serving cell c. $PL_c$ is the downlink pathloss estimate calculated in the UE for serving cell c in dB and $PL_c$=referenceSignalPower–higher layer filtered reference signal received power (RSRP), where referenceSignalPower is provided by higher layers and RSRP and the higher layer filter configuration are defined for the reference serving cell. If serving cell c belongs to a timing advance group (TAG)

containing the primary cell then, for the uplink of the primary cell, the primary cell is used as the reference serving cell for determining referenceSignalPower and higher layer filtered RSRP. For the uplink of the secondary cell, the serving cell configured by the higher layer parameter pathlossReferenceLinking is used as the reference serving cell for determining referenceSignalPower and higher layer filtered RSRP. If serving cell c belongs to a TAG not containing the primary cell then serving cell c is used as the reference serving cell for determining referenceSignalPower and higher layer filtered RSRP.

If the total transmit power of the UE would exceed $\hat{P}_{CMAX}(i)$, the UE scales $\hat{P}_{PUSCH,c}(i)$ for the serving cell c in subframe i such that Equation 4 is satisfied.

$$\sum_c w(i) \cdot \hat{P}_{PUSCH,c}(i) \le \left(\hat{P}_{CMAX}(i) - \hat{P}_{PUCCH}(i)\right) \quad \text{\langle Equation 4\rangle}$$

In Equation 4, $\hat{P}_{PUCCH}(i)$ is the linear value of $P_{PUCCH}(i)$, $\hat{P}_{PUSCH,c}(i)$ is the linear value of $P_{PUSCH,c}(i)$, $\hat{P}_{CMAX,c}(i)$ is the linear value of the UE total configured maximum output power $P_{CMAX}$ in subframe i and w(i) is a scaling factor of $\hat{P}_{PUSCH,c}(i)$ for serving cell c where $0 \le w(i) \le 1$. In case there is no PUCCH transmission in subframe i, $\hat{P}_{PUCCH}(i)=0$.

If the UE has PUSCH transmission with uplink control information (UCI) on serving cell j and PUSCH without UCI in any of the remaining serving cells, and the total transmit power of the UE would exceed $\hat{P}_{CMAX}(i)$, the UE scales $\hat{P}_{PUSCH,c}(i)$ for the serving cells without UCI in subframe i such that Equation 5 is satisfied.

$$\sum_{c \ne j} w(i) \cdot \hat{P}_{PUSCH,c}(i) \le \left(\hat{P}_{CMAX}(i) - \hat{P}_{PUCCH,j}(i)\right) \quad \text{\langle Equation 5\rangle}$$

$\hat{P}_{PUSCH,j}(i)$ is the PUSCH transmit power for the cell with UCI and w(i) is a scaling factor of $\hat{P}_{PUSCH,c}(i)$ for serving cell c without UCI. In this case, no power scaling is applied to $\hat{P}_{PUSCH,j}(i)$ unless $$\sum_{c \ne j} w(i) \cdot \hat{P}_{PUSCH,c}(i) = 0$$

and the total transmit power of the UE still would exceed $\hat{P}_{CMAX}(i)$. Note that w(i) values are the same across serving cells when w(i)>0 but for certain serving cells w(i) may be zero.

If the UE has simultaneous PUCCH and PUSCH transmission with UCI on serving cell j and PUSCH transmission without UCI in any of the remaining serving cells, and the total transmit power of the UE would exceed $\hat{P}_{CMAX}(i)$, the UE obtains $\hat{P}_{PUSCH,c}(i)$ according to Equation 6.

$$\hat{P}_{PUSCH,j}(i) = \min\left(\hat{P}_{PUSCH,j}(i), \left(\hat{P}_{CMAX}(i) - \hat{P}_{PUCCH}(i)\right)\right) \quad \text{\langle Equation 6\rangle}$$

$$\sum_{c \ne j} w(i) \cdot \hat{P}_{PUSCH,c}(i) \le \left(\hat{P}_{CMAX}(i) - \hat{P}_{PUCCH}(i) - \hat{P}_{PUSCH,j}(i)\right)$$

If the UE is configured with multiple TAGs, and if the PUCCH/PUSCH transmission of the UE on subframe i for a given serving cell in a TAG overlaps some portion of the first symbol of the PUSCH transmission on subframe i+1 for a different serving cell in another TAG, the UE shall adjust its total transmission power to not exceed $P_{CMAX}$ on any overlapped portion.

If the UE is configured with multiple TAGs, and if the PUSCH transmission of the UE on subframe i for a given serving cell in a TAG overlaps some portion of the first symbol of the PUCCH transmission on subframe i+1 for a different serving cell in another TAG, the UE shall adjust its total transmission power to not exceed $P_{CMAX}$ on any overlapped portion.

If the UE is configured with multiple TAGs, and if the SRS transmission of the UE in a symbol on subframe i for a given serving cell in a TAG overlaps with the PUCCH/PUSCH transmission on subframe i or subframe i+1 for a different serving cell in the same or another TAG, the UE shall drop SRS if its total transmission power exceeds $P_{CMAX}$ on any overlapped portion of the symbol.

If the UE is configured with multiple TAGs and more than 2 serving cells, and if the SRS transmission of the UE in a symbol on subframe i for a given serving cell overlaps with the SRS transmission on subframe i for a different serving cell(s) and with PUSCH/PUCCH transmission on subframe i or subframe i+1 for another serving cell(s), the UE shall drop the SRS transmissions if the total transmission power exceeds $P_{CMAX}$ on any overlapped portion of the symbol.

If the UE is configured with multiple TAGs, the UE shall, when requested by higher layers, to transmit physical random access channel (PRACH) in a secondary serving cell in parallel with SRS transmission in a symbol on a subframe of a different serving cell belonging to a different TAG, drop SRS if the total transmission power exceeds $P_{CMAX}$ on any overlapped portion in the symbol.

If the UE is configured with multiple TAGs, the UE shall, when requested by higher layers, to transmit PRACH in a secondary serving cell in parallel with PUSCH/PUCCH in a different serving cell belonging to a different TAG, adjust the transmission power of PUSCH/PUCCH so that its total transmission power does not exceed $P_{CMAX}$ on the overlapped portion.

Uplink power control for the PUCCH is described. If serving cell c is the primary cell, the setting of the UE transmit power $P_{PUCCH}$ for the PUCCH transmission in subframe i is defined by Equation 7.

$$P_{PUCCH}(i) = \min\begin{Bmatrix} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{Bmatrix} \text{[dBm]} \quad \text{\langle Equation 7\rangle}$$

If the UE is not transmitting PUCCH for the primary cell, for the accumulation of TPC command received with DCI format 3/3A for PUCCH, the UE shall assume that the UE transmit power $P_{PUCCH}$ for the PUCCH transmission in subframe i is computed by Equation 8.

$$P_{PUCCH}(i) = \min\{P_{CMAX,c}(i), P_{0\_PUCCH} + PL_c + g(i)\} \text{ [dBm]} \quad \text{<Equation 8>}$$

In equations described above, $P_{CMAX,c}(i)$ is the configured UE transmit power in subframe i for serving cell c. The parameter $\Delta_{F\_PUCCH}(F)$ is provided by higher layers. If the UE is configured by higher layers to transmit PUCCH on two antenna ports, the value of $\Delta_{TxD}(F')$ is provided by higher layers. Otherwise, $\Delta_{TxD}(F')=0$. $h(n_{CQI}, n_{HARQ}, n_{SR})$ is a PUCCH format dependent value, where $n_{CQI}$ corresponds to the number of information bits for the channel quality information (CQI). $n_{SR}$=1 if subframe i is configured for SR for the UE not having any associated transport block for UL-SCH, otherwise $n_{SR}$=0=0. $P_{O\_PUCCH}$ is a parameter composed of the sum of a parameter $P_{O\_NOMINAL\_PUCCH}$ provided by higher layers and a parameter $P_{O\_UE\_PUCCH}$ provided by higher layers.

Hereinafter, a method for controlling uplink power according to embodiments of the present invention is described. An embodiment of the present invention may propose power control aspects when inter-site carrier aggregation is used for a UE. Inter-site carrier aggregation may be defined as that a UE is configured with multiple carriers where at least two carriers are associated with separate eNBs which may be connected by ideal backhaul or non-ideal backhaul. when a UE can perform simultaneous two UL transmissions (including PUSCH/PUCCH), the following cases may be considered.

Case 1: FDD+FDD or same DL/UL configuration TDD+TDD over idea backhaul
Case 2: FDD+FDD or same DL/UL configuration TDD+TDD over non-idea backhaul
Case 3: FDD+TDD or different DL/UL configuration TDD+TDD over ideal backhaul
Case 4: FDD+TDD or different DL/UL configuration TDD+TDD over non-ideal backhaul When a UE cannot be able to perform simultaneous two UL transmissions, the following cases may be considered.

Case 5: FDD+FDD or same DL/UL configuration TDD+TDD over idea backhaul
Case 6: FDD+FDD or same DL/UL configuration TDD+TDD over non-idea backhaul
Case 7: FDD+TDD or different DL/UL configuration TDD+TDD over ideal backhaul
Case 8: FDD+TDD or different DL/UL configuration TDD+TDD over non-ideal backhaul An embodiment of the present invention may focus on a case where power control for each eNB is managed separately. If more than one CC is configured within one eNB, uplink power control used in 3GPP LTE rel-11 may be applicable among intra-eNB carriers. More specifically, an embodiment of the present invention may consider a case where each carrier group is assigned with maximum power which can be used within a carrier group when power limited case (i.e., the sum of required power for all uplink channels exceeds the maximum power for the UE) occurs. Furthermore, an embodiment of the present invention may propose how to utilize the total UE power when the total power of requested power per carrier group may exceed the total UE power. Also, an embodiment of the present invention may propose how to utilize the minimum reserved power per carrier group and how to share the unallocated remaining power between carrier groups. Also, an embodiment of the present invention may propose how to handle power allocation per physical channel such as PRACH and PUCCH. Above description which the embodiments of the present invention proposes may be also applied to cases, such as case 1 or case 3 described above, where single eNB maintains more than one carrier group. When a UE is configured with two carrier groups being configured by a single eNB, the present invention may be applied differently, e.g., including different parameters. In other words, the present invention may be applied to carrier groups configured by a single eNB with some clarifications and changes if necessary.

Hereinafter, for the convenience, a case where more than one carrier group is configured by a single eNB where each carrier group may have a carrier receiving PUCCH is called "PUCCH offloading". Each carrier group may have multiple carriers, even though the number of PUCCH carrier may be limited to only one per carrier group.

Further, when power is allocated per carrier group or per eNB, and when one carrier group is removed due to e.g., radio link failure (RLF) or poor performance, it may be assumed that parameter becomes invalid even without reconfiguration. For example, it is assumed that minimum guaranteed power is allocated to MeNB and SeNB as 20% and 20% respectively. When the SeNB is de-configured due to RLF, until the SeNB is reconfigured, the power allocation is not used by the UE (thus, reserve power for the SeNB would not be occurred). In other words, power allocation per carrier group or per eNB may be valid only if two carrier groups or two eNBs are active. Otherwise, the UE shall ignore those parameters. This may be interpreted as if a UE is "reconfigured" with different power allocation when a carrier group changes or the SeNB changes (e.g., assign 100% to the MeNB or the first carrier group with PCell).

1. A method for allocating $P_{CMAX}$, which is configured maximum power, per eNB or per carrier group according to an embodiment of the present invention is described. According to this method, $P_{CMAX}$ for each eNB or each carrier group may be configured semi-statically.

According to an embodiment of the present invention, when more than one eNBs serve a UE, the maximum usable power may be configured by each eNB separately or separately for each eNB. Or, the maximum usable power may be configured separately to the carrier group where a PCell belongs and to the group(s) where a super SCell (or, master SCell) belongs. In other words, separate maximum power is maintained for each eNB or each carrier group. Hereinafter, the maximum usable power per each eNB or each carrier group according to an embodiment of the present invention is represented as $P_{CMAX,eNBj}$, while the maximum power for the UE is represented as $P_{CMAX}$. For example, assuming two eNBs, i.e., eNB1 and eNB2, are serving the UE, each eNB may configure different maximum usable power depending on its condition and other factors. Alternatively, only maximum usable power for the second carrier group (e.g., eNB2) may be allocated by the eNB1, and all the remaining power ($P_{CMAX}$—the maximum power allocated to the second carrier group (or others)) may be utilized for the first carrier group. Alternatively, only maximum usable power for the first carrier group (e.g., eNB1) may be allocated by the eNB1, and all the remaining power may be utilized for the second carrier group. Hereinafter, maximum power for the first carrier group (or, first eNB) and maximum power for the second carrier group (or, second eNB) may be called $P_{CMAX,eNB1}$ and $P_{CMAX,eNB2}$, respectively. $P_{CMAX,eNB1} \leq P_{CMAX}$ and $P_{CMAX,eNB2} \leq P_{CMAX}$. Depending on its configuration with consideration of maximum power reduction (MPR), the UE may calculate $P_{CMAX,eNB1}$ and $P_{CMAX,eNB2}$ accordingly and report the calculated maximum power to two eNBs. To avoid unnecessary cross-carrier-group power scaling issue, the sum of maximum power for both eNBs may not exceed $P_{CMAX}$. That is, $P_{CMAX}=P_{CMAX,eNB1}+P_{CMAX,eNB2}$. To ensure this, it may be considered that the UE will be configured with only one maximum power, i.e., one of either $P_{CMAX,eNB1}$ or $P_{CMAX,eNB2}$, and the other maximum power will be computed based on the maximum power for the UE.

Alternatively, even if a UE is configured with maximum power for both eNBs, if the sum of maximum power for both eNBs exceeds $P_{CMAX}$, the proper power scaling on the other eNB based on one eNB may be considered. More specifically, the power scaling may be applied only if the UE experiences power limited case. For example, if $P_{CMAX,eNB1}+P_{CMAX,eNB2}>P_{CMAX}$, the UE may take one of either $P_{CMAX,eNB1}$ or $P_{CMAX,eNB2}$ and the remaining maximum power is adjusted based on min $\{P_{CMAX}-P_{CMAX,eNB1}, P_{CMAX,eNB2}\}$. In terms of taking which eNB power as intact may be configured. Or, MeNB may be always maintained or SeNB may be always maintained. In this case, the UE may indicate the situation to the MeNB such that the MeNB may reconfigure the maximum usable power for each eNB or each carrier group. If the MeNB allocates only $P_{CMAX,eNB2}$, then the UE may assume that $P_{CMAX,eNB1}=P_{CMAX}-P_{CMAX,eNB2}$ and reports $P_{CMAX,eNB1}$ to the MeNB.

When each carrier group has multiple carriers configured, maximum power allocated for each carrier may be smaller than the maximum power allocated to the entire carrier group. Otherwise, the UE may assume that the minimum of two values as the maximum power per carrier. These parameters may be used for any uplink transmission to the target eNB. For example, any uplink transmissions to the eNB1 may use $P_{CMAX,eNB1}$ as the maximum power for the eNB1 and any uplink transmissions to the eNB2 may use $P_{CMAX,eNB2}$ as the maximum power for the eNB2. If each eNB configures multiple CCs, power control within an eNB may be performed following uplink power control used in 3GPP LTE rel-11. Alternatively, $P_{CMAX,eNB1}$ and $P_{CMAX,eNB2}$ may be signaled to the eNBs separately. Or, the percentage between two eNBs may also be configured where a UE divide the maximum power for the UE to each eNB based on the configured ratio. For example, if the configured ratio is 80%/20% between two eNBs, 80% of the configured maximum power for the UE may be used for transmission to the eNB1, whereas 20% of the maximum power for the UE may be used for transmission to the eNB2, respectively.

$P_{CMAX,eNB1}$ and $P_{CMAX,eNB2}$ may be exchanged between two eNBs. The MeNB may inform the information to the SeNB implicitly or explicitly. When a UE is configured with the values, the UE may implicitly inform the SeNB.

Individual power control for each channel/signal in each carrier group/eNB may follow uplink power control used in 3GPP LTE rel-11. When power for each signal is determined, for CCs belonging to the same eNB, power scaling may be performed as follows. The detailed function may not be limited to the description below. However, in principle, power control may be performed separately for each eNB (e.g., MeNB/SeNB or stand-alone eNB/assisting eNB), and uplink power control used in 3GPP LTE rel-11 may be applied within each power control loop.

If $P^{\hat{}}_{CMAX,eNBj}(i)$ is configured for eNBj, and if the total transmit power of the UE would exceed $P^{\hat{}}_{CMAX,eNB}j(i)$, the UE scales $P^{\hat{}}_{PUSCH,eNBj,c}(i)$ for the serving cell c belonging to eNBj in subframe i such that Equation 9 is satisfied.

$$\sum_c w(i) \cdot \hat{P}_{PUSCH,eNBj,c}(i) \leq (\hat{P}_{CMAX,eNBj}(i) - \hat{P}_{PUCCH,eNBj}(i)) \quad \text{(Equation 9)}$$

In Equation 9, $P^{\hat{}}_{PUCCH,eNBj}(i)$ is the linear value of $P_{PUCCH,eNBj}(i)$, $P^{\hat{}}_{PUSCH,eNBj,c}(i)$ is the linear value of $P_{PUSCH,eNBj,c}(i)$, $P^{\hat{}}_{CMAX,eNBj}(i)$ is the linear value of the UE total configured maximum output power $P_{CMAX,eNBj}$ and w(i) is a scaling factor of $P^{\hat{}}_{PUSCH,eNBj,c}(i)$ for serving cell c where $0 \leq w(i) \leq 1$. In case there is no PUCCH transmission in subframe i, $P^{\hat{}}_{PUCCH,eNBj}(i)=0$.

Otherwise, if $P^{\hat{}}_{CMAX,eNB1-j}(i)$ is configured for eNB$_{1-j}$, then $P_{CMAX,eNBj}(i)=P_{CMAX}-P^{\hat{}}_{CMAX,eNB1-j}(i)$. If the total transmit power of the UE would exceed $P^{\hat{}}_{CMAX,eNB}j(i)$, the UE scales $P^{\hat{}}_{PUSCH,eNBj,c}(i)$ for the serving cell c belonging to eNBj in subframe i such that Equation 9 described above is satisfied.

In other words, power control may be handled separately per eNB (per media access control (MAC)) where multiple CCs and power scaling within an eNB may be handled same as 3GPP LTE rel-11 carrier aggregation as long as PUCCH is transmitted on only one CC (PCell or PCell-equivalent CC).

Further, inter-eNB power control may be also necessary. Equation 10 shows total power of each eNBj.

$$TP_{sum,eNBj}(i) = \sum_c w(i) \cdot \hat{P}_{PUSCH,eNBj,c}(i) + \hat{P}_{PUCCH,eNBj}(i) \quad \text{(Equation 10)}$$

As a first condition for inter-eNB power control, offset between total powers may be considered. The first condition for inter-eNB power control may be omitted depending on band combination. If uplink bands are not close each other, the first condition may not be addressed. Specifically, for intra-band dual connectivity, if Equation 11 is satisfied, it may be considered that the first condition is passed.

$$|TP_{sum,eNB0}(i) - TP_{sum,eNB1}(i)| <= P_{threshold} \quad \text{<Equation 11>}$$

In Equation 11, $P_{threshold}$ may either signaled by higher layer or calculated based on band-combinations of aggregated carriers as well as aggregated eNBs. Otherwise, power scaling may be applied again according to Equation 12.

$$\sum_c w(i) \cdot \hat{P}_{PUSCH,eNB0,c}(i) \leq \quad \text{(Equation 12)}$$
$$(TEMP_{CMAX,eNB0}(i) - \hat{P}_{PUCCH,eNB0}(i))$$
$$TEMP_{CMAX,eNB0}(i) = P_{threshold} + TP_{sum,eNB1}(i)$$

In Equation 12, it is assumed that eNB0 is the MeNB (or higher power UL transmission target eNB). Alternatively, when first condition fails, the UE may drop uplink signals according to the priority list.

As a second condition for inter-eNB power control, sum of two powers may be considered. If total power for two eNBs exceeds $P_{CMAX}$, uplink signals may be dropped according to the priority. Or, scaling may be performed as well. The first/second condition may not be needed when a UE cannot be able to perform simultaneous two UL transmissions.

2. A method for allocating $P_{alloc}$, which is configured minimum reserved power, per eNB or per carrier group according to an embodiment of the present invention is described.

According to an embodiment of the present invention, when more than one eNBs serve a UE, $P_{alloc}$ may be configured by each eNB separately or separately for each eNB. Or, $P_{alloc}$ may be configured separately to the carrier group where PCell belongs and to the group(s) where a super SCell (or master SCell) belongs. $P_{alloc}$ may be used to guarantee minimum reserved power allocation per carrier group or per eNB when power limited case occurs. In other words, separate minimum reserved power is maintained for each eNB or each carrier group. These parameters may be used along with the maximum usable power per eNB or other parameters such as $P_{CMAX,c}$ as well.

Various methods for allocating $P_{alloc}$ per each carrier group or per each eNB may be considered as follows.

(1) The MeNB may configure both $P_{alloc,eNB1}$ and $P_{alloc,eNB2}$ respectively. That is, the MeNB may determine the minimum reserved power allocated to each eNB when there is at least one uplink transmission.

(2) $P_{alloc}$ may be inferred from the maximum usable power per eNB. For example, $P_{alloc}$ for the SeNB may be calculated as $P_{CMAX}-P_{CMAX,eNB}$ (similarly to $P_{alloc}$ for the MeNB) if the maximum usable power per eNB is configured. In this case, regardless of power limited case, each eNB may utilize the power up to $P_{CMAX,eNB}$ only and $P_{CMAX}-P_{CMAX,eNB}$ may be reserved for the successive subframe transmission from the other eNB.

(3) The MeNB and SeNB may configure independently $P_{alloc}$ per eNB. A UE may report "mis-configuration" if the summation of two values exceed the maximum power for the UE. Alternatively, if the sum exceeds the maximum power for the UE, the UE may calculate $P_{alloc,SeNB}=P_{CMAX}-P_{alloc,MeNB}$ (set to the remaining power) so that it would not exceed the maximum power for the UE. Or, $P_{alloc,MeNB}=P_{CMAX}-P_{alloc,SeNB}$ may be also considerable. Or, it may be further considerable that the network may configure which one to reduce the power between two eNBs. Furthermore, it may be also notable that the minimum reserved power for each carrier group or each eNB may be configured as a form of ratio instead of absolute values. The ratio may be applied based on the UE configured maximum power after applying necessary MPR and other reductions. Alternatively, the ratio may be applied based on the maximum power for the UE per power class (such as 23 dBm) if the summation of two values do not exceed $P_{CMAX}$. However, the ratio may be applied based on $P_{CMAX}$ once the summation of two values by ratio computation exceeds $P_{CMAX}$. For example, if there is 6 dB power loss due to MPR, and ratio is 50%/50%, the UE may apply the ratio based on $P_{CMAX}$. Another approach of applying $P_{alloc,xeNB}$ is to apply MPR and everything by setting $P_{alloc,xeNB}$ as the maximum power per each carrier group. The techniques described here may also be applicable to $P_{CMAX,xeNB}$ as well described above.

(4) The UE may determine $P_{alloc}$ per eNB and report the values to both eNBs. The UE may calculate $P_{alloc}$ for both eNBs based on pathloss and some higher layer configured power control parameters.

(5) The MeNB may configure only $P_{alloc,eNB2}$ (for the SeNB) which the UE may use as a minimum reserved power for SeNB transmission. When power limited case occurs, (optionally if the UE has at least one uplink transmission to the SeNB), the minimum reserved power for the SeNB should be guaranteed. In this case, if the MeNB wants to configure all power to the MeNB, the configured $P_{alloc,eNB2}$ value may be zero. The motivation of allocating $P_{alloc,eNB2}$ to the SeNB is to guarantee a minimum reserved power to the SeNB when power limited case occurs. $P_{alloc,eNB2}$ may be used as a baseline power for the SeNB such that at least $P_{alloc,eNB2}$ power is used toward the SeNB when the required power towards the SeNB exceeds $P_{alloc,eNB2}$ if the power limited case occurs.

Once $P_{alloc}$ is configured, $P_{alloc}$ may be utilized according to various methods described as follows. For example, if $P_{alloc}$ per eNB is configured for both the MeNB and SeNB respectively, the minimum reserved power for each carrier group or each eNB may be set as the configured $P_{alloc}$. For unused power ($=P_{CMAX}-P_{alloc,eNB1}-P_{alloc,eNB2}$), power sharing rule may be applied. If either carrier group requires less power than the minimum reserved power, the remaining power may be used by the other carrier group. For another example, if $P_{alloc}$ per eNB is configured for the SeNB only, the minimum reserved power for the SeNB may be set as the configured $P_{alloc,SeNB}$. For unused power ($=P_{CMAX}-P_{alloc,SeNB}$), power sharing rule may be applied. The similar procedure may be applicable to the case where $P_{alloc}$ is configured only for the MeNB. For another example, at subframe n for the MeNB, and subframe k for the SeNB, assume that subframe n for the MeNB is overlapped with subframe k and k+1 for the SeNB. If at least one subframe has uplink transmission either in subframe k or subframe k+1 for the SeNB, uplink power for the MeNB should not exceed $P_{CMAX}-P_{alloc,SeNB}$. In other words, for the SeNB transmission, minimum reserved power should be reserved. This may be generalized to the case where a UE should not allocate more than $P_{CMAX}-P_{alloc,SeNB}$ towards MeNB transmission if at least one subframe is uplink subframe per configuration (either subframe k or subframe k+1 for the SeNB). The similar condition may be applicable to the MeNB as well. For unused power, power sharing rule may be applied. After applying power sharing rule, power scaling used in carrier-aggregation framework may be performed within a group.

Applying power sharing rule is described. All unused power may be first assigned to the MeNB, and then the remaining power not allocated to the MeNB may be assigned to the SeNB if exists. Alternatively, all unused power may be assigned to the PCell, and then the remaining power may be assigned to the sPCell (special scell in secondary carrier group (SCG)). The remaining power may be equally or weighted equally assigned to the MeNB and SeNB if exists. Alternatively, all unused power may be assigned equally to MeNB/SeNB. Alternatively, all unused power may be assigned with weight for MeNB/SeNB (e.g., 80%/20%). Alternatively, all unused power may be assigned according to channel/UCI type priority between MeNB/SeNB (such as PRACH≥PUCCH+SR≥PUCCH+HARQ-ACK≥PUCCH+CSI≥PUSCH+HARQ-ACK≥PUSCH+CSI-≥PUSCH, etc).

Channel priority between two carrier groups (or, two eNBs) is further described in detail. Unused power may be allocated depending on power sharing rule between two carrier groups. In the following some examples are described.

PRACH on MeNB/PRACH on SeNB: PRACH on the MeNB or PCell may be always be prioritized. $P_{alloc}$ per eNB may not limit the power for PRACH. In other words, PRACH transmission to the SeNB may use the unused power after PRACH transmission to the MeNB regardless of configuration of $P_{alloc}$. If PRACH on the SeNB cannot be allocated with the required power, PRACH may be delayed or dropped. Other channels in the MeNB or SeNB (e.g., other than PUCCH or PRACH) may be dropped if the UE experiences power limited case. For PUCCH or PRACH, the remaining power may be still applied (and thus power-scaled) and transmitted.

PRACH on MeNB/PUCCH on SeNB: PRACH on the MeNB may always be prioritized. $P_{alloc}$ per eNB may not limit the power for PRACH. In other words, PUCCH transmission to the SeNB may use the unused power after PRACH transmission to the MeNB. Other channels in the MeNB or SeNB (other than PUCCH or PRACH) may be dropped if the UE experiences power limited case. Alternatively, PRACH on the SeNB may have higher priority than PUCCH such that the required power can be allocated regardless of the configuration of minimum reserved power.

PUCCH on MeNB/PRACH on SeNB: PRACH transmission to the SeNB may use ($P_{CMAX}$–$P_{PUCCH}$) where $P_{PUCCH}$=min (PUCCH power, $P_{alloc,MeNB}$). In other words, PRACH transmission to the SeNB may use the unused power after PUCCH transmission to the MeNB. Other channels in the MeNB or SeNB (other than PUCCH or PRACH) may be dropped if the UE experiences power limited case.

PUCCH on MeNB/PUCCH on SeNB: $P_{alloc}$ per eNB may be used for splitting power between two PUCCH transmissions. Moreover, when $P_{CMAX,eNB}$ is allocated, the maximum usable power per eNB may be used to determine the power for PUCCH transmission. The same thing may be applied to the case of PUCCH or PUSCH with HARQ-ACK on MeNB/PUCCH or PUSCH with HARQ-ACK on SeNB. The power for the PUCCH (or PUSCH with UCI) may be determined as min (PUCCH power, $P_{alloc,eNB}$). In other words, if both uplink transmission has HARQ-ACK transmission, the allocated power may be used to determine power for HARQ-ACK transmission. If there is unused power left and some other uplink channels exists (such as PUSCH), the unused power may be used for transmission of other channels. This may be generalized to cases where PUSCH with UCI has the same priority to the PUCCH. Moreover, PUCCH without HARQ-ACK may be treated as "non-PUCCH" or non-HARQ ACK, and thus may not assign the $P_{alloc}$ in that case depending on the available power.

PUSCH on MeNB/PUCCH on SeNB: Priority may be given to the PUCCH on the SeNB and the power for the PUCCH may be assigned as min (PUCCH power, $P_{alloc,SeNB}$). Unused power may be allocated to the PUSCH transmission of the MeNB.

PUCCH on MeNB/PUSCH on SeNB: similarly, the PUCCH on the MeNB may be maintained. In this case, if $P_{alloc}$ for the MeNB is configured as well, the power for the PUCCH on the MeNB is determined as min (PUCCH power, $P_{alloc,MeNB}$). Unused power may be used for other transmissions.

PUCCH/PUSCH on MeNB/PUCCH on SeNB: minimum reserved power $P_{alloc}$ is used for PUCCH transmission for each eNB. The PUSCH on the MeNB may be allocated from unused power. Thus, power for the PUCCH on the MeNB=min (PUCCH power, $P_{alloc,MeNB}$), and power for the PUCCH on the SeNB=min (PUCCH power, $P_{alloc,SeNB}$). When unused power is allocated to PUSCH transmissions, it may be equally or weighted distributed across eNBs or the MeNB may utilize all the unused power.

PUSCH on MeNB/PUSCH on MeNB: Equal power scaling may be utilized. Or weighted scaling may be utilized. In this case, PUSCH with UCI may have higher priority over PUSCH without UCI.

Once $P_{alloc,xeNB}$ is configured, it may be applicable to the PUCCH and PUSCH. However, the power allocated to PRACH and SRS may be treated separately.

In the description above, the PUCCH generally refers the PUCCH with HARQ-ACK, PUSCH with HARQ-ACK (and may be PUCCH with UCI and PUSCH with UCI). Power of SRS may not be assured by $P_{alloc}$ per eNB if configured. In other words, if only SRS transmission is scheduled to another eNB in power limited case, the SRS may be dropped regardless of $P_{alloc}$ configuration. $P_{alloc}$ may also be applicable to PRACH transmission as well similar to PUCCH transmission. In other words, when PRACH/PRACH transmission occurs, $P_{alloc}$ per eNB may be used for power for the PRACH. $P_{CMAX,eNB}$ may be used instead of $P_{alloc,eNB}$ in the above prioritization and power allocation, if $P_{CMAX,eNB}$ is configured. For example, $P_{CMAX,eNB}$ may be used only when PUCCH/PUCCH collide or PRACH/PRACH collide.

Further, the PRACH may utilize the maximum power for the UE regardless of power split between two eNBs. More specifically, PRACH transmission of master carrier group (MCG) may be able to utilize the maximum power for the UE. If on-going transmission and PRACH transmission collide with each other, the UE may reduce power for the on-going transmission if sum of power for the on-going transmission and power for the PRACH transmission exceeds the maximum power for the UE. Power for other channel (such as PUSCH or PUCCH) on on-going transmission may be power-scaled at least in the overlapped portion between PRACH transmission and on-going transmission.

Figure 8:
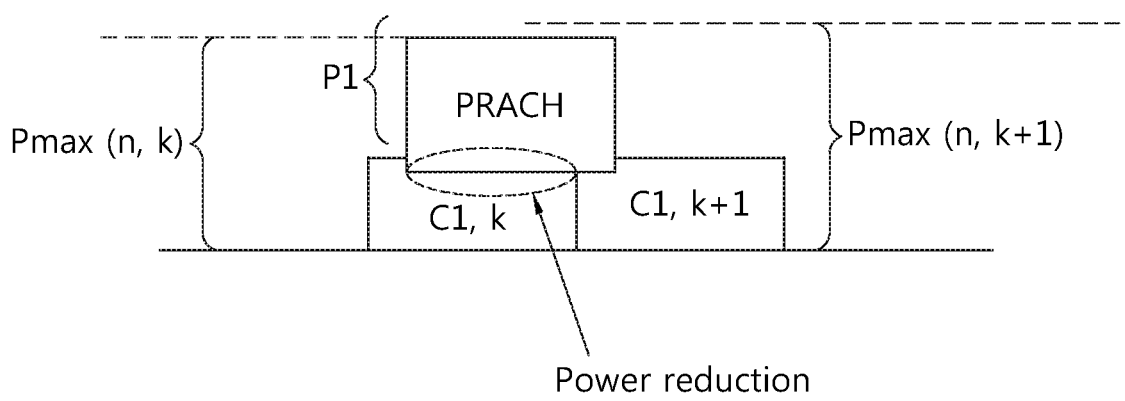
FIG. 8 shows an example of power reduction due to PRACH transmission in power limited case.

FIG. 8 shows an example of power reduction due to PRACH transmission in power limited case. Referring to FIG. 8, maximum power in subframe k is configured as Pmax (n, k) and maximum power in subframe (k+1) is configured as Pmax (n, k+1). In the middle of uplink transmission in subframe k, PRACH transmission is performed. Since the sum of required power for the PRACH transmission (P1) and power for on-going transmission (C1, k) exceeds Pmax (n,k), power reduction is performed for the on-going transmission.

Further, the techniques for $P_{alloc}$ described above may be applicable to the cases where only $P_{CMAX,SeNB}$ is configured. In that case, $P_{CMAX,SeNB}$ may be assumed to be the same as $P_{alloc,SeNB}$.

Further, $P_{alloc,eNB}$ may be represent as "the assured power value" where at least one eNB has higher priority than the other eNB in those power range. For example, with 23 dBm power class, a UE may be allowed to have higher priority to the SeNB up to 20 dBm if $P_{alloc,SeNB}$=20 dBm is configured. Similar assumption may be applied to the MeNB as well. The unused power may be allocated across two eNBs following power sharing rule described above.

Figure 9:
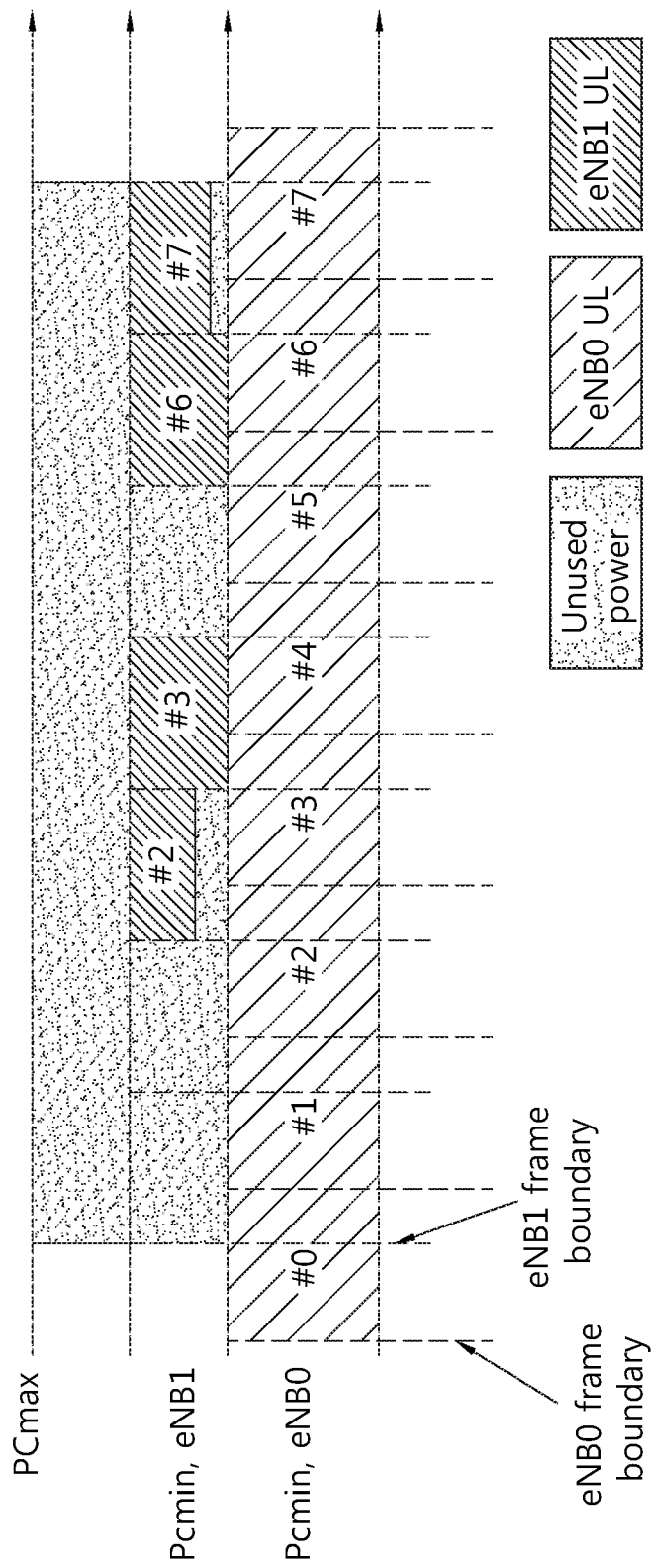
FIG. 9 and FIG. 10 show an example of uplink power allocation according to an embodiment of the present invention.
Figure 10:
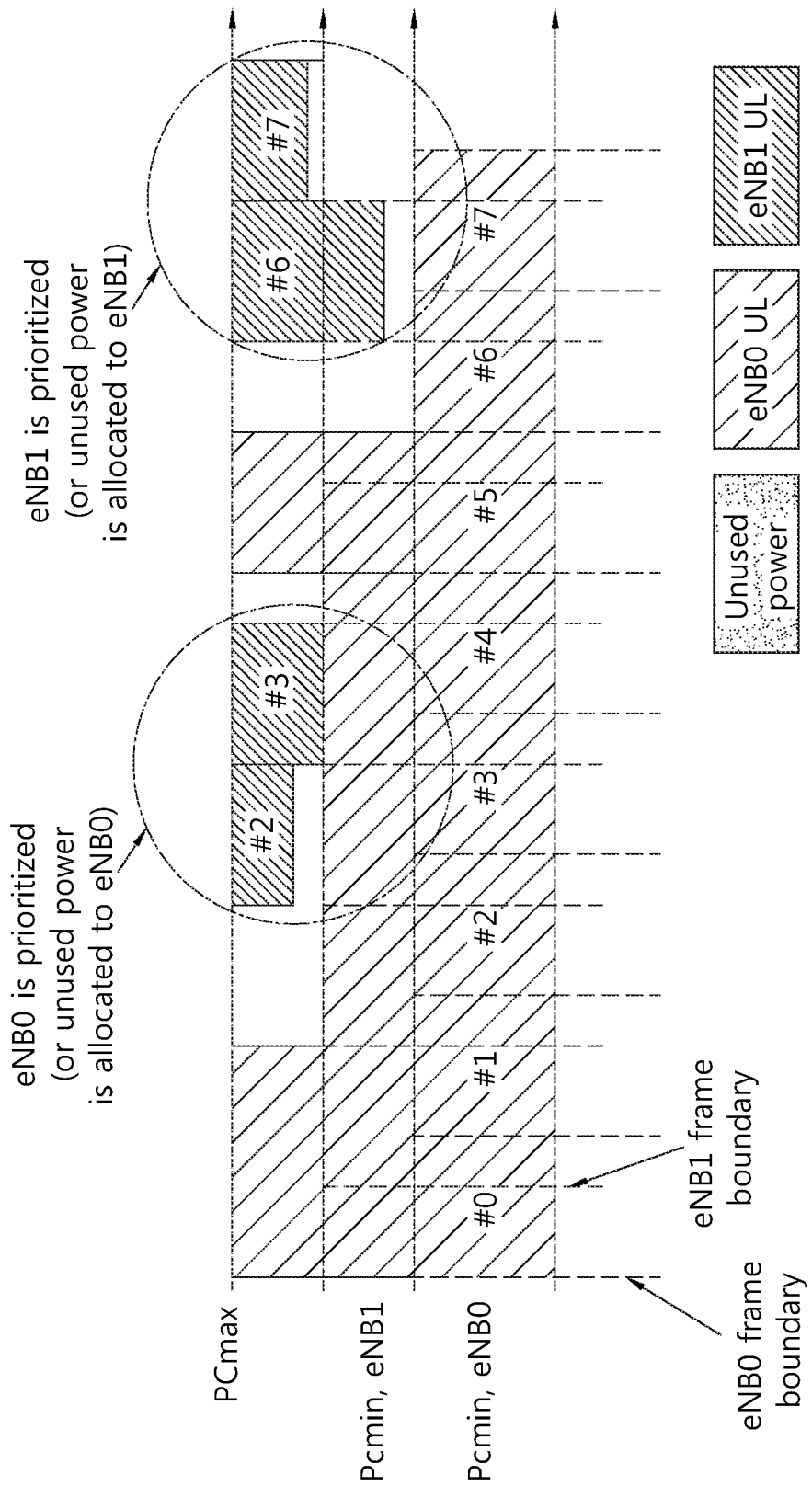

FIG. 9 and FIG. 10 show an example of uplink power allocation according to an embodiment of the present invention. Subframe #2/#3 and #6/#7 of eNB1 is used for uplink transmission. Power may be shared between two eNBs wherever subframes of two eNBs overlap. For example, in subframe #2/#3 in FIG. 10, eNB0 may be prioritized or the unused power may be allocated to eNB0 (e.g., MeNB) as eNB1 does not have any other uplink transmission. On the other hand, in subframe #6/#7 in FIG. 11, unused power may be allocated to eNB1. Actual power allocation may be determined based on the power sharing rule between two eNBs or across the channels.

To protect potential uplink transmission in the next subframe in which the UE may not know the exact power when determining the current subframe's power, the UE may assume that at least minimum reserved power is allocated to the next subframe including "flexible uplink subframe configured by enhanced interference mitigation & traffic adaptation (eIMTA)". For example, if subframe #3 of eNB1 is used for uplink subframe, when determining power for subframe #2 of eNB1, it shall consider minimum reserved power ($P_{alloc,\ eNB1}$) is allocated to subframe #3 of eNB1 regardless of uplink transmission scheduling or PUCCH scheduling. If no uplink transmission occurs in subframe #3 of eNB1, the allocated power may be unused. However, it will avoid the case where previous transmission may affect the next potential uplink transmission between two eNBs. In other words, the UE may allocate maximum power $P_{CMAX}$ to eNB0 only when there is no uplink transmission scheduled or potentially planned for the overlapped subframes of eNB1 (and vice versa). Otherwise, the UE may allocate maximum power of ($P_{CMAX}-P_{alloc,eNB1}$) to eNB0 to leave the minimum reserved power for eNB1. In terms of sharing the unused power between two eNBs, one or sets of alternatives may be used. When there is no uplink scheduled in the other eNB, the maximum power for the UE may be allocated to one eNB in both overlapped subframes.

More specifically, this may be applied only when asynchronous power control is configured (i.e., a UE is higher layer configured with asynchronous power control mode) or a UE is configured with $P_{alloc}$ value at least one eNB. When multiple TA technique is used, instead of looking at both overlapped subframes, the UE may only look at one subframe where the overlap portion is greater than the other. For example, the overlap between subframe n and subframe k (between two eNBs) is 0.8 ms whereas the overlap between subframe n+1 and subframe k is 0.2 ms, the UE may look at only subframe n/k overlap to determine unused power, power scaling and the power limited case. This may be allowed only if the UE is configured with synchronous power control mode or the UE is not capable of shorter processing time or the UE is configured by higher layer to perform this way.

For power scaling and dropping for inter-site CA between two eNBs, various methods may be used as follows.

Power for the PUCCH may not be scaled. When power scaling is used, the PUCCH has the top priority (other than PRACH), thus power scaling on the PUCCH should not be attempted. When PUCCHs are transmitted to different eNBs, PUCCH for PCell eNB may have higher priority and PUCCH having the lower priority may be dropped if only PUCCH transmissions are attempted and the total power for PUCCH transmissions exceeds the maximum power for the UE. Or, the UE may be configured with priority between two eNBs to drop PUCCH for PUCCH transmissions with power limited case.

PUSCH with UCI has higher priority than PUSCH without UCI

Power for the SRS power may not be scaled. If the SRS collides with other uplink signals, the SRS may be dropped.

The PRACH has higher priority than other signals. More than one PRACH may not be transmitted within a same eNB or a carrier group. A carrier group may refer to a group contains one carrier where the PUCCH is transmitted. When PRACHs transmissions to different eNBs collide with each other, PRACH of PCell eNB has higher priority. Or, the UE may be configured with priority between two eNBs.

PRACH having lower priority may be dropped. Power for the PRACH may not be scaled. When the PRACH and PUCCH collide with each other and power for the PRACH and PUCCH exceeds the maximum power for the UE, the PUCCH may be dropped. Alternatively, PUCCH to PCell with PRACH to SCell may be transmitted with power scaling on the PUCCH.

Generally, PUCCH or PRACH has higher priority than other channels. The lowest priority would be the SRS compared to other uplink channels and if power limitation occurs, the SRS may be dropped from any CC. If there is still power limitation issue after dropping the SRS, power scaling on the PUSCH may be attempted. Even still, there is power limitation between PUCCH/PRACH, PUCCH/PUCCH, PRACH/PRACH, and some priority rule may be needed. Between the PUCCH and PRACH, the PRACH initiated by PDCCH order has higher priority than the PUCCH. The PUCCH may have higher priority than other PRACH transmissions.

When PUCCH/PUCCH collides, if duplex modes of two carriers are the same (or two eNBs's PCell), the PCell has higher priority than the super SCell, thus, power scaling on the PUCCH to the SCell may be attempted. The same thing may be applied to PRACH (where detail scaling may be further different depending on how PRACH is initiated). However, if duplex modes of two carriers are different from each other, due to the lower number of uplink subframes and thus potentially higher number of ACK/NACK bits transmitted in one uplink PUCCH transmission, the super SCell with TDD may have higher priority than the FDD PCell. When the PCell and super SCell have both TDD configured, TDD DL/UL configuration with lower number of uplink subframes may have higher priority instead of putting higher priority on the PCell. Similar scaling rule may be applied to PRACH/PRACH collision as well.

Alternatively, a UE can be configured to drop uplink signal when total power exceeds the maximum power for the UE between two eNBs UL transmissions. Within one eNB, dropping rule used in 3GPP LTE rel-11 may be applied. New dropping rule applies only to the cases where inter-site CA is applied or PUCCH is transmitted to more than one CC within an eNB. Alternatively, when power limited case occurs, then the UE may be configured with maximum tolerance per each carrier group which may be used for power scaling/reduction per carrier group. The UE performs power scaling per carrier group by reducing the maximum tolerance level. After power reduction per each carrier group, if the total power still exceeds the maximum power for the UE, the UE may prioritize transmission to the MeNB (or C-Plane). Otherwise, unused power may be allocated back to the MeNB or equally or weighted equally to carrier groups.

Alternatively, the UE may be configured with maximum tolerance for the SeNB. When power limited case occurs, power reduction on the SeNB transmission is attempted for maximum tolerance level (e.g., 20% tolerance level, SeNB power can be reduced up to 80% of assigned power). After attempting power scaling on the SeNB, if the total power does not exceed maximum power for the UE, the UE may transmit. Otherwise, transmission to the SeNB can be dropped (i.e., MeNB transmission may be prioritized). Instead of prioritizing on the MeNB transmission, transmission to the PCell may only be prioritized as well. In that case, the tolerance may be applied to other cells except for the PCell to meet the maximum power. When power scaling is not feasible within the tolerance level, some channels may be dropped.

When dropping is configured, the priority of channels may be order or PRACH-PUCCH-PUSCH with UCI-PUSCH without UCI-SRS. That is, the dropping priority may be similar to scaling priority. When the same channels are colliding with each other between two eNBs, priority eNB may be configured. Alternatively, order of PRACH-HARQ-ACK/SR-CSI-data may be considered. By default, the UE assume that higher priority is given to the eNB which maintains C-Plane connection (e.g., PCell). By allocating power effectively between two eNBs and coordinating uplink subframes and scheduling, it is expected that not many subframes will experience power limitation case between two eNBs to avoid performance degradation at each eNB. When two eNBs are connected by ideal or good backhaul, instead of dropping the signals, it may be piggybacked to the other uplink signal. From physical layer perspective, inter-site CA may be considered as more than one higher layers are configured to the UE. Overall, the dropping or dropping rule in the power-limited case may be configured to the UE via higher layer signaling as well. By default, the UE may assume that power scaling rule is applied without any explicit configuration.

In the approach described above, if the allocated power to each eNB does not exceed the maximum power for the UE, power scaling across uplink transmissions may not be necessary. In this case, the UE may utilize $P_{alloc}$ per eNB to determine which channel to protect. For example, only PUSCH transmissions are scheduled, instead of scaling down all PUSCH transmissions, at least one PUSCH transmission with power larger than $P_{alloc}$ per eNB may be guaranteed. Or, $P_{alloc}$ per eNB may be used to determine which channel to drop. For example, if the power allocated to a channel is less than $P_{alloc,eNB}$, the channel may be dropped as it may not reach the eNB. More specifically, the value may be used for determining PUCCH drop case only.

Figure 11:
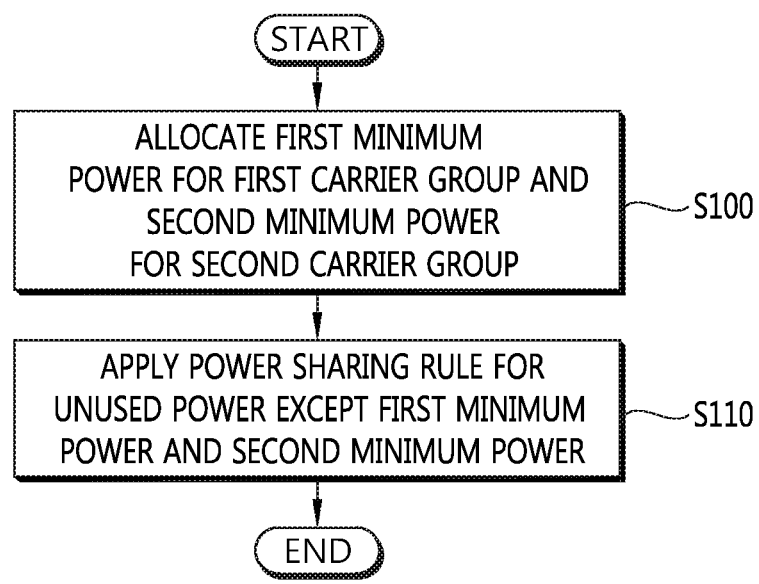
FIG. 11 shows an example of a method for controlling uplink power according to an embodiment of the present invention.

FIG. 11 shows an example of a method for controlling uplink power according to an embodiment of the present invention. The embodiment of FIG. 11 corresponds to a method for allocating $P_{alloc}$, which is configured minimum reserved power, per eNB or per carrier group described above.

In step S100, the UE allocates a first minimum reserved power for a first carrier group and a second minimum reserved power for a second carrier group. The first minimum reserved power and the second minimum reserved power may be configured by the MeNB. The first minimum reserved power and the second minimum reserved power may be configured by a ratio. The first minimum reserved power and the second minimum reserved power may not limit power of PRACH transmission of the UE. The first carrier group may correspond to the MeNB in dual connectivity, and the second carrier group may correspond to the SeNB in dual connectivity. The first carrier group may include a plurality of CCs, and the second carrier group may include a plurality of CCs.

In step S110, the UE applies power sharing rule for unused power except the first minimum reserved power and the second minimum reserved power. The unused power may be determined as a value obtained by subtracting the first minimum reserved power and the second minimum reserved power from a maximum power for the UE. The power sharing rule may be applied according to channel priority. The PRACH may have a highest priority. The PUCCH may have a higher priority than the PUSCH. The PUSCH with UCI may have a higher priority than the PUSCH without the UCI.

The UE may further perform power scaling within the first carrier group and the second carrier group based on the first minimum reserved power and the second minimum reserved power respectively. If there is no uplink transmission for the second carrier group, a maximum power for the UE may be allocated to the first carrier group.

Two-step power limit according to an embodiment of the present invention is described. In this approach, a UE is configured with maximum power per each carrier group. First, the UE measures the total power of all uplink transmissions. To allow potentially not-aligned subframe boundary of uplink transmissions to each carrier group, the UE may measure the total power at subframe n as well as n+1 (or k+1 in general). If total power for both subframes does not exceed the maximum power for the UE, the UE may transmit with the assigned power for each channel. If power limited case occurs, the UE may apply the maximum power allocated to each carrier group per carrier group by applying the rule used in 3GPP LTE rel-11. In this case, even after power scaling, if power still exceeds the maximum power for the UE, power scaling across eNBs may be attempted. After applying maximum power limit per carrier group, if the total power is less than the maximum power for the UE, unused power may be assigned to carrier group where power scaling has occurred. If power scaling is performed for both carrier groups, e.g., due to lower maximum power allocated to carrier groups, then the unused power may be allocated to the MeNB or equally (or with some weights) to each carrier group.

When determining where the total power exceeds the $P_{CMAX}$ or not, for the SRS, it may be measured over the symbol. However, for PUCCH or PUSCH, there could be different approaches.

The procedure of the two-step power limit is as follows.

1> If the total transmit power of the UE would not exceed, $P_{CMAX}(i)$, transmit all channels.

1> else if $P_{CMAX,eNB1}(i)$ and $P_{CMAX,eNB2}(i)$ are configured without $P_{alloc,eNB1}(i)$ and $P_{alloc,eNB2}(i)$ configured:

2> if the total transmit power of the UE to eNB1 exceeds $P_{CMAX,eNB1}(i)$, compute the unused power to the eNB2 (or other carrier groups)

3> $P_{CMAX,eNB1}(i)=P_{CMAX,eNB1}(i)$+unused power

3> Perform power scaling within a carrier group of the eNB1 following the rule used in 3GPP LTE rel-11 to reduce the total power to the eNB1 equal or less than $P_{CMAX,eNB1}(i)$ 2> if the total transmit power of the UE to the eNB2 exceeds $P_{CMAX,eNB2}(i)$, compute the unused power to the eNB1 (or other carrier groups)

3> $P_{CMAX,eNB2}(i)=P_{CMAX,eNB2}(i)$+unused power

3> Perform power scaling within a carrier group of the eNB2 following the rule used in 3GPP LTE rel-11 to reduce the total power to the eNB2 equal or less than $P_{CMAX,eNB2}(i)$ 1> else if $P_{CMAX,eNB1}(i)$ and $P_{CMAX,eNB2}(i)$ are configured with $P_{alloc,eNB1}(i)$ and/or $P_{alloc,eNB2}(i)$ configured:

2> if the total transmit power of the UE to the eNB1 exceeds $P_{CMAX,eNB1}(i)$, compute the unused power to the eNB2 (or other carrier groups)

3> $P_{CMAX,eNB1}(i)=P_{CMAX,eNB1}(i)$+unused power

3> Perform power scaling within a carrier group of the eNB1 following the rule used in 3GPP LTE rel-11 to reduce the total power to the eNB1 equal or less than $P_{CMAX,eNB1}(i)$ 2> if the total transmit power of the UE to the eNB2 exceeds $P_{CMAX,eNB2}(i)$, compute the unused power to the eNB1 (or other carrier groups)

3> $P_{CMAX,eNB2}(i)=P_{CMAX,eNB2}(i)$+unused power

3> Perform power scaling within a carrier group of the eNB2 following the rule used in 3GPP LTE rel-11 to reduce the total power to the eNB2 equal or less than $P_{CMAX,eNB2}(i)$ 1> else if $P_{alloc,eNB1}(i)$ and/or $P_{alloc,eNB2}(i)$ are configured:

2> if the total transmit power of the UE to the eNB1 exceeds $P_{alloc,eNB1}(i)$, compute the unused power to the eNB2 (or other carrier groups) assuming the eNB1 is the MeMB and the MeNB is prioritized 3> $P_{C,eNB1}(i)=P_{alloc,eNB1}(i)+(P_{CMAX}-P_{alloc,eNB2}(i))$ 3> Perform power scaling within a carrier group of the eNB1 following the rule used in 3GPP LTE rel-11 to reduce the total power to the eNB1 equal or less than $P_{CMAX,eNB1}(i)$ 2> if the total transmit power of the UE to the eNB2 exceeds $P_{alloc,eNB2}(i)$, compute the unused power to the eNB1 (or other carrier groups) assuming the eNB1 is the MeMB and the MeNB is prioritized 3> $P_{C,eNB2}(i)=P_{alloc,eNB2}(i)$+unused power 3> Perform power scaling within a carrier group of the eNB2 following the rule used in 3GPP LTE rel-11 to reduce the total power to the eNB2 equal or less than $P_{CMAX,eNB2}(i)$ If the SeNB is prioritized, the above formulation is changed between the eNB1 and eNB2.

Figure 12:
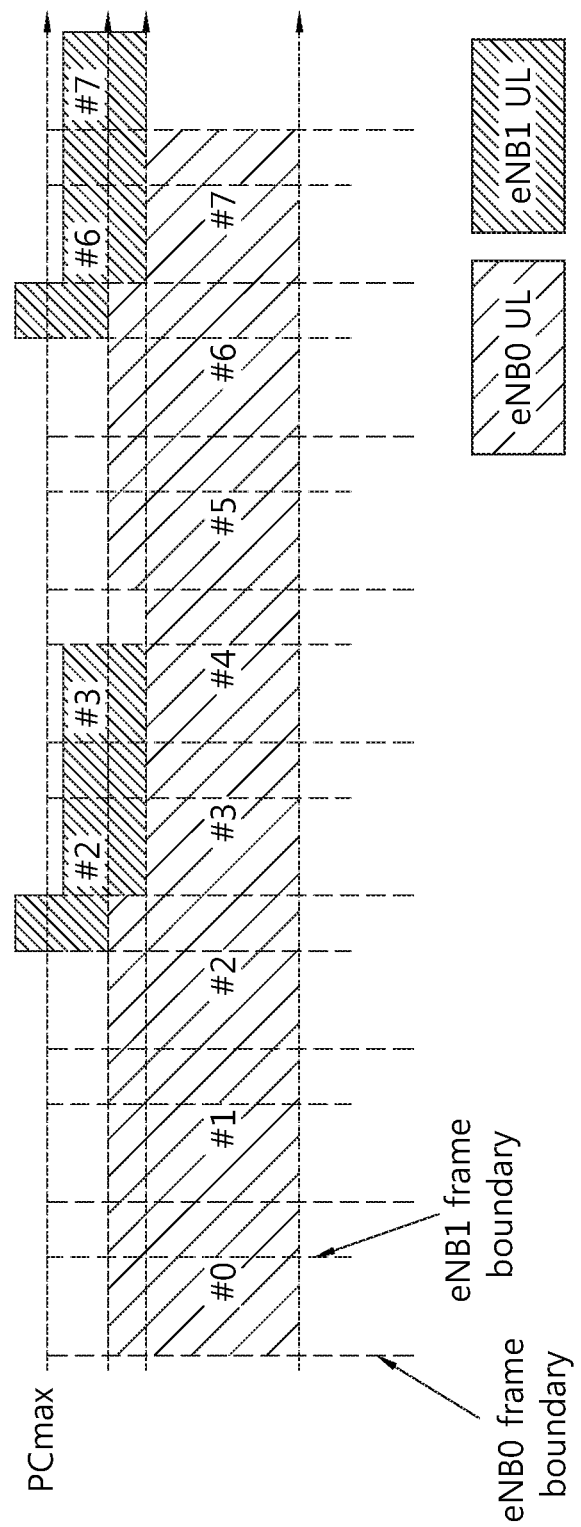
FIG. 12 shows an example of two-step power limit approach according to an embodiment of the present invention.

FIG. 12 shows an example of two-step power limit approach according to an embodiment of the present invention. Subframe #2/#3 and #6/#7 of eNB1 is used for uplink transmission. At subframe #2 for the eNB0, the total power of the UE may not exceed the maximum power for the UE as the total power would be measured over subframe boundary of #2 of the eNB0 where only partially uplink transmission to #2 is used. Thus, even though instance power at a certain point may exceed $P_{CMAX}$, the UE may still transmit both uplink without any issue.

In terms of determining power limited case, a few examples may be considered
 power limited case is determined if at any moment, maximum power exceeds the maximum power for the UE (referring to FIG. 12, subframe #2 of the eNB0 transmission may have power limited case)
 power limited case is determined if the total power over 1 ms exceeds the maximum power for the UE (referring to FIG. 12, subframe #2 of the eNB0 transmission may not have power limited case)
 power limited case is determined if one subframe overlaps with two subframes of other carrier group transmission, and if either one has power limited case (referring to FIG. 12, subframe #2 of the eNB0 transmission may have power limited case)

Due to different scheduling and configuration, if network is not synchronized, during one subframe, there may be two $P_{CMAX}$ values. In this case, either the minimum or maximum value may be chosen for computing power limited case. Moreover, the SRS and other channel such as PUSCH may overlap where different power limited condition may be considered.

In power limited case, if power limit occurs for both carrier groups, the UE may apply the maximum power allocated to each eNB individually. If power limit occurs only for single carrier group, unused power from non-power limited carrier group (aligned with overlapped portion) may be allocated to the other carrier group.

Figure 13:
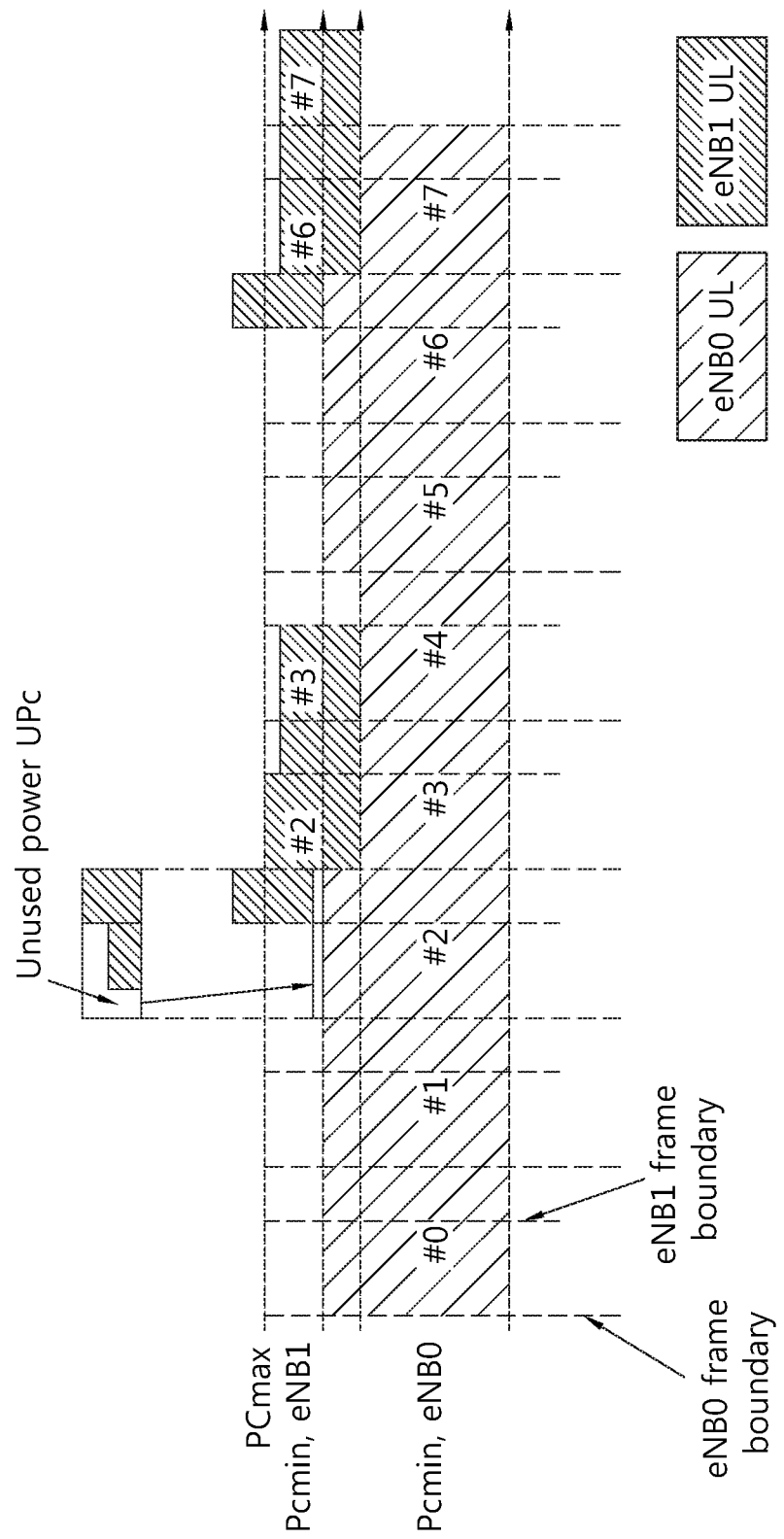
FIG. 13 shows another example of two-step power limit approach according to an embodiment of the present invention.

FIG. 13 shows another example of two-step power limit approach according to an embodiment of the present invention. It is assumed that at subframe #2 of UL transmission to the eNB0 has power limited cases for the eNB0. Unused power for the eNB1 UL can be applied to the eNB0 UL transmission. If unused power is UPc, it may be spread over 1 ms and may be used for power for UL transmission to the eNB0. Using the allocated maximum power and power added by unused portion may be used for performing power scaling within a group again. More specifically, for PRACH power ramping, allocated power per carrier group may be used as a limit such that power ramping beyond $P_{CMAX,eNB1}$ (or $P_{CMAX,eNB2}$) would not be allowed. This may limit the power for PRACH, yet, it may not cause any packet drop at physical layer.

Power limitation per carrier group according to an embodiment of the present invention is described. This option is similar to two-step power limit. Only the difference is that a UE measure the total power per carrier group. If the power exceeds the maximum allocated power for both carrier group, power scaling occurs within a carrier group per the allocated maximum power. If the power exceeds the maximum allocated power for only one carrier group, unused power from the other group is applied to the first group and then power scaling is performed even still the power limited case occurs for the group. The procedure of power limitation per carrier group is the same as the procedure of the two-step power limit described above. In terms of determining "unused power", a few approaches may be considered.
 average of unused power over 1 ms by the other carrier group
 minimum of unused power of n or n+1 subframe by the other carrier group assuming subframe # n and subframe # n+1 overlap with uplink transmission to the group
 maximum of unused power of n or n+1 subframe
 average of unused power of n and n+1 subframe
 min (unused power in n subframe, $P_{CMAX}-P_{alloc\_xeNB}$) where xeNB is the eNB of subframe n.

In the description above, actual unused power may be calculated according to various methods. First, if maximum power per each carrier group is allocated, the unused power may be calculated as ($P_{CMAX,eNB1}$–allocated power for eNB1 carrier group). If, power allocation ratio is configured such as 60%/40% to each eNB carrier group, the unused power may be calculated as ($P_{CMAX}$*ratio to eNB1–allocated power for eNB1 carrier group). Alternatively, regardless of power allocation, unused power may be calculated as ($P_{CMAX}(i)$–current power to the eNB1–current power to the eNB2). Alternatively, $P_{CMAX}(i)$ may be chosen as a minimum between $P_{CMAX}(i)$ and $P_{CMAX}(i+1)$ where the allocated power for the eNB1 is selected as max (allocated power at subframe i, allocated power at subframe i+1). If only the SRS is transmitted in either subframe, and if the SRS and other channel do not collide with each other, the power for the SRS should not be accounted for the used power.

For $P_{alloc}$ per eNB, $P_{alloc}$ may be computed by configuring $P_{O\_PUSCH,c}$ where c is for PCell or sPCell (a cell where PUCCH is transmitted in the SeNB) and $\alpha_c(j)$ and/or $\Delta_{TF,c}(i)+f_c(i)$) or a single value may be configured. $P_{O\_PUCCH}$, g(i) and some margin for PUCCH transmission may be considered. A UE may compute $P_{alloc}$ per eNB as $P_{cmin,eNBj}(i)=\min \{P_{CMAX,c}(j), P_{O\_PUCCH}+PL_c+g(i)+\Delta\}$ or $P_{cmin,eNBj}(i)=\min \{P_{CMAX,c}(j), P_{O\_PUSCH}+\alpha(j)PL_c+\Delta T_{TF,c}(i)+f_c(i)+\Delta\}$. To protect PUCCH transmission, it is desirable to use PUCCH parameters. However, the UE may be configured with two different $P_{alloc}$ values for PUCCH and PUSCH respectively. These values may not be applicable to PRACH transmission. In that case, to transmit PRACH, if power scaling occurs, channel with lower power than the $P_{alloc}$ may be dropped. Alternatively, power used for PRACH may be also used for $P_{alloc}$ per eNB as well.

The goal of this $P_{alloc}$ per eNB is to guarantee minimum reserved power used for at least one uplink channel per eNB. The quality (reception quality) should be preserved so that by configuring $P_{alloc}$ per eNB properly, and accordingly, protection of important channel such as PUCCH or PUSCH can be achieved. For example, the MeNB may configure $P_{alloc,SeNB}$ to the minimum reserved power needed for PUCCH transmission for the SeNB so that PUCCH transmission can be assured. Another example is to $P_{alloc,MeNB}$ may be configured so that PUCCH transmission to the MeNB can be assured. When $P_{alloc}$ is configured, PRACH transmission may take higher priority such that at least one PRACH may be transmitted regardless of $P_{alloc}$ per eNB. In summary, $P_{alloc}$ per eNB may be configured by higher layer or determined by the UE (and informed to each eNB optionally).

Figure 14:
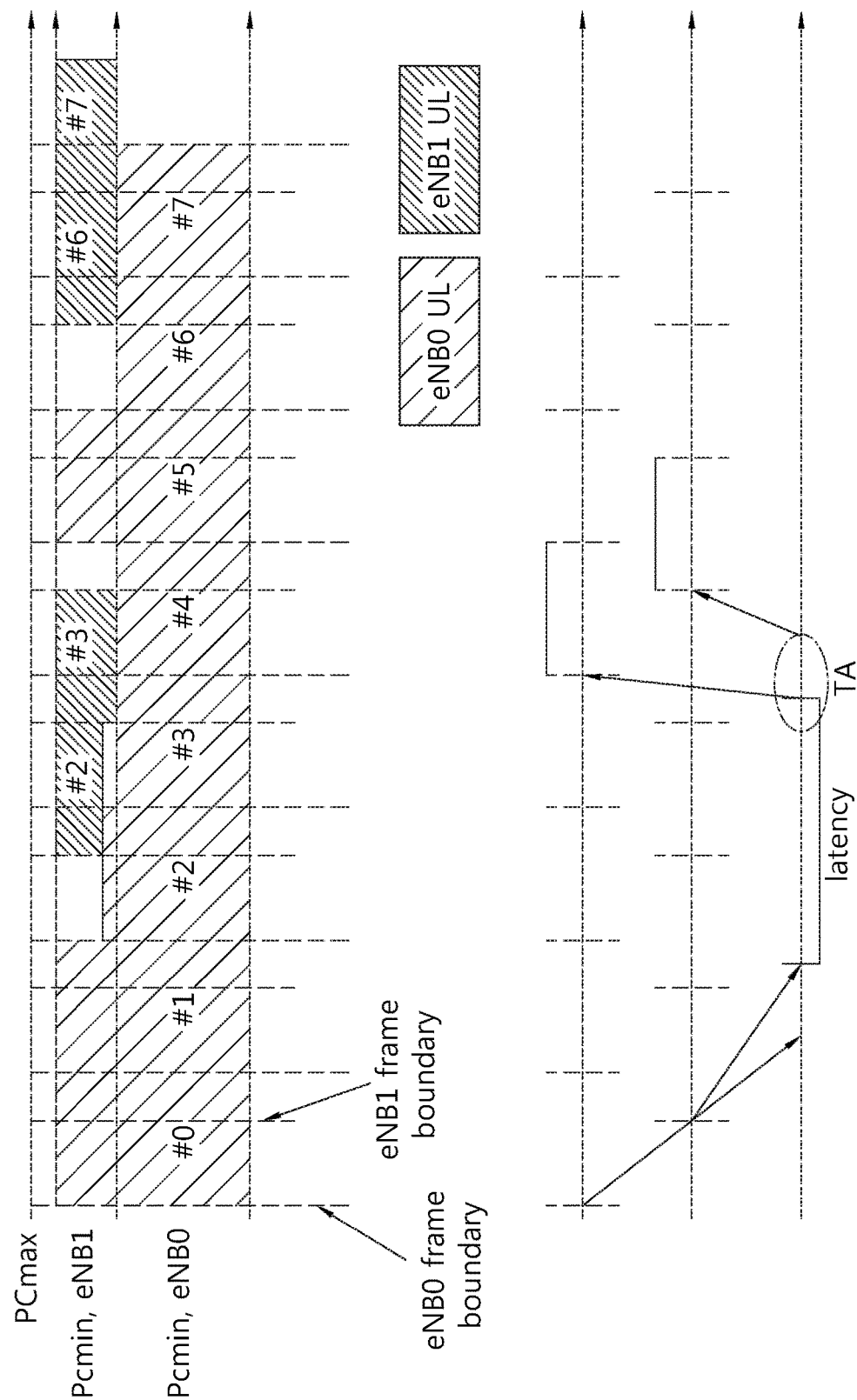
FIG. 14 shows an example of latency processing of a UE.

FIG. 14 shows an example of latency processing of a UE. In terms of UE processing latency to handle asynchronous case, depending on UE capability, whether the UE can use both subframes to determine power limited case or not may be determined. For example, referring to FIG. 14, the UE may need to handle power computation and resource allocations less than 2 ms if power for subframe n and n+1 should be considered for the other eNB's uplink transmission at subframe n. The UE may report the capability whether it can handle the uplink grant within the shorter duration or not, so that the network may configure proper way of handling power limited case and computing unused power computation. Since one subframe to the eNB1 overlaps with two subframes to the eNB2, when computing unused power, two values may be computed and either minimum or maximum or average value may be used for lending the unused power to different eNB.

Assuming a network may configure different power control scheme for asynchronous case and synchronous case respectively, how to determine both cases may be further discussed. One example is to utilize the subframe and system frame number (SFN) offset difference between two eNBs reported by the UE. Which mode the operation is based on may be signaled to the UE through a higher layer. Another example is based on UE capability. In this case, the UE may report which mode should be used.

UE power selection is described. Instead of network configuration, a UE may select maximum power autonomously as well. In this case, power headroom report (PHR) values may be reflected properly so that each eNB can compute the power for the UE. To address potentially TDD/FDD inter-node aggregation or TDD/TDD inter-node resource aggregation, the UE may send two sets of PHRs as well where one with high power and one with low power depending on the uplink configuration of the other eNB. Also, the UE may send the configuration (DL/UL) and timing gap between two carrier groups so that each eNB may utilize different uplink characteristics.

Along with allocating maximum/minimum power per carrier group, utilizing the maximum/minimum power only for a subset of channels instead of for all channels may be considered. For example, PRACH transmission may not be restricted by the maximum power allocated to each group. Regardless of the maximum power allocated to each group, PRACH may be transmitted with highest priority with high power (yet lower than the maximum UE power). This is to allow efficient PRACH transmission. If this case is applied, either some channel would be dropped when PRACH is transmitted or power scaling on other channel to allow high power on PRACH may be necessary.

UE behavior to drop PRACH in a power limited case may be different in inter-node resource aggregation case and PUCCH offloading case. In PUCCH offloading, it is up to the UE which one to drop in case of collision with PRACH. More specifically, in PUCCH offloading, the UE is not required to maintain two PRACH processes simultaneously and thus whenever more than one PRACH collide with each other, the UE is free to drop one PRACH process. Thus, whether carrier groups are formed to support inter-node resource aggregation or PUCCH offloading may be assumed. It may be further assumed that the UE is not configured with both inter-node resource aggregation and PUCCH offloading case unless PUCCH carrier is shared between two eNBs by some means.

Additionally, when a UE performs power scaling and inter-site CA is configured, the UE may indicate that power scaling is applied. Alternatively, the UE may indicate that power scaling is used regardless of inter-site or intra-site CA. A multiple approach may be feasible to inform whether the power scaling has been applied or not. One example is to change demodulation reference signal (DMRS) sequence of PUSCH by using different initialization value or cyclic shift. For example, $$c_{init} = \left\lfloor \frac{N_{ID}^{cell}}{30} \right\rfloor \cdot 2^{10} + f_{ss}^{PUSCH}$$

may be configured for PUSCH which has been power-scaled. Other means to differentiate DMRS sequence between PUSCH with/without power scaling may be used. Another example is to transmit the information through higher layer so that higher layer may report power limitation occurrence. In this case, power scaling report may be reported to both eNBs (i.e., more than one higher layers) when dual connectivity is configured for the MeNB and SeNB.

Furthermore, if it is assumed that a UE is able to indicate whether power scaling is used or not, different modulation and coding scheme (MCS) may be considered with and without power scaling on PUSCH transmission. For example, if MCS=8 has been configured to a UE with configured power, then MCS=6 may be used when power scaling is applied. A set of mapping table between MCS delta and power scaling amount may be considered as well. For example, MCS delta may be 2 when power scaling is 2 dB.

If $P_{alloc}$ is configured per each carrier group or per eNB where a UE reserves the allocated power to the other eNB, then there may be power available even though the UE has only SRS transmission scheduled. If the requested power for SRS is higher than $P_{alloc,eNB}$, then there are two choices. First is dropping the SRS as power is not sufficient, and second is transmitting the SRS with remaining power. When determining whether to use remaining power for SRS transmission or not, the UE may look-ahead for transmissions to the other eNB so that it uses power only when the other eNB or carrier group does not have any data (other than SRS). If remaining power is not available due to potential transmission in the other eNB or power limited case, since at least $P_{alloc}$ is reserved, it may be further considered to transmit SRS with lower power than the requested. In this case, it is desirable to notify that SRS has been transmitted with lower power ($P_{alloc}$) by using different scrambling sequence or other means. Some remaining power may be applied even though it still not meet the requested power for the SRS. It is not desirable to transmit SRS with the remaining power. Thus, it may be assumed that if the SRS is transmitted, the power may be either (1) $P_{CMAX,c}$ (2) $P_{alloc,xeNB}$ (3) the requested power.

Not to disturb power control loop, it may be assumed that the SRS is dropped if (1) or (3) cannot be met (i.e., either $P_{CMAX,c}$ or the requested power). In other words, the SRS may be transmitted only if the requested power for the SRS has been satisfied or $P_{CMAX,c}$ has been reached.

Figure 15:
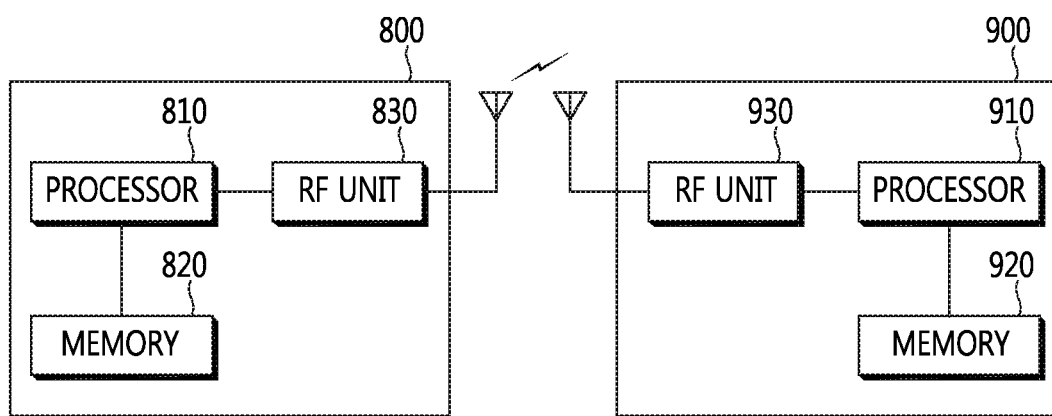
FIG. 15 is a block diagram showing wireless communication system to implement an embodiment of the present invention.

FIG. 15 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a user equipment (UE) in a wireless communication system, the method comprising:
   receiving, by the UE, information on a guaranteed power for a first carrier group (CG) and information on a guaranteed power for a second CG from a network via a higher layer,
   wherein the guaranteed power for the first CG is a minimum power allocated to the first CG and the guaranteed power for the second CG is a minimum power allocated to the second CG; and
   determining, by the UE, an uplink power for the first CG in a first subframe based on the guaranteed power for the second CG, a channel priority and an unused power from the guaranteed power for the second CG in a second subframe which overlaps with the first subframe in time; and
   performing an uplink transmission to the first CG in the first subframe based on the uplink power for the first CG,
   wherein the UE is connected to both a master eNodeB (MeNB) and a secondary eNB (SeNB) in dual connectivity.

2. The method of claim 1, wherein the information on the guaranteed power for the first CG and the information on the guaranteed power for the second CG is received from the MeNB.

3. The method of claim 1, wherein the guaranteed power for the first CG and the guaranteed power for the second CG are configured based on a ratio.

4. The method of claim 1, wherein the uplink transmission is a physical random access channel (PRACH) transmission, and
   wherein the uplink power for the first CG is not limited by the guaranteed power for the second CG.

5. The method of claim 1, wherein a PRACH has a highest priority in the channel priority.

6. The method of claim 1, wherein a physical uplink control channel (PUCCH) has a higher priority than a physical uplink shared channel (PUSCH) in the channel priority.

7. The method of claim 1, wherein a PUSCH with uplink control information (UCI) including at least one of a hybrid automatic repeat request (HARQ)-acknowledgement (ACK) or a scheduling request (SR) has a higher priority than a PUSCH with UCI not including at least one of the HARQ-ACK or the SR in the channel priority.

8. The method of claim 1, wherein a PUSCH with UCI has a higher priority than a PUSCH without the UCI in the channel priority.

9. The method of claim 1, wherein the uplink power for the first CG is allocated determined from any remaining power, wherein the remaining power is derived by subtracting the guaranteed power for the second CG from a configured maximum power for the UE.

10. The method of claim 1, further comprising:
    performing power scaling within the first CG and the second CG.

11. The method of claim 1, wherein the first CG is a master cell group (MCG) for the MeNB, and
    wherein the second CG is a secondary cell group (SCG) for the SeNB.

12. The method of claim 1, wherein the first CG is a SCG for the SeNB, and
    wherein the second CG is a MCG for the MeNB.

13. The method of claim 1, wherein the first CG includes a plurality of component carriers (CCs), and
    wherein the second CG includes a plurality of CCs.

14. A user equipment (UE) in a wireless communication system, the UE comprising:
    a memory;
    a receiver and a transmitter; and
    a processor, operatively coupled to the memory and the receiver and the transmitter,
    wherein the processor UE is configured to:
      receive information on a guaranteed power for a first carrier group (CG) and information on a guaranteed power for a second CG from a network via a higher layer,
      wherein the guaranteed power for the first CG is a minimum power allocated to the first CG and the guaranteed power for the second CG is a minimum power allocated to the second CG,
      determine an uplink power for the first CG in a first subframe based on the guaranteed power for the second CG, a channel priority and an unused power from the guaranteed power for the second CG in a second subframe which overlaps with the first subframe in time, and perform an uplink transmission to the first CG in the first subframe based on the uplink power for the first CG, wherein the UE is connected to both a master eNodeB (MeNB) and a secondary eNB (SeNB) in dual connectivity.

15. A processor for a wireless communication device in a wireless communication system, wherein the processor is configured to:

control the wireless communication device to receive information on a guaranteed power for a first carrier group (CG) and information on a guaranteed power for a second CG from a network via a higher layer, wherein the guaranteed power for the first CG is a minimum power allocated to the first CG and the guaranteed power for the second CG is a minimum power allocated to the second CG, and determine an uplink power for the first CG in a first subframe based on the guaranteed power for the second CG, a channel priority and an unused power from the guaranteed power for the second CG in a second subframe which overlaps with the first subframe in time, and control the wireless communication device to perform an uplink transmission to the first CG in the first subframe based on the uplink power for the first CG, wherein the UE is connected to both a master eNodeB (MeNB) and a secondary eNB (SeNB) in dual connectivity.

* * * * *